US009964230B2

(12) United States Patent
Johnson

(10) Patent No.: US 9,964,230 B2
(45) Date of Patent: May 8, 2018

(54) RETARDER CONTROL VALVE ASSEMBLY AND SYSTEM FOR RAIL CARS

(71) Applicant: EDCO USA, Fenton, MO (US)

(72) Inventor: Edwin L. Johnson, Ballwin, MO (US)

(73) Assignee: EDCO USA, Fenton, MO (US)

( * ) Notice: Subject to any disclaimer, the term of this patent is extended or adjusted under 35 U.S.C. 154(b) by 0 days. days.

(21) Appl. No.: 15/676,251

(22) Filed: Aug. 14, 2017

(65) Prior Publication Data

US 2017/0363222 A1 Dec. 21, 2017

Related U.S. Application Data

(62) Division of application No. 14/533,679, filed on Nov. 5, 2014, now Pat. No. 9,732,876.

(60) Provisional application No. 61/900,154, filed on Nov. 5, 2013.

(51) Int. Cl.
| | |
|---|---|
| *F15B 13/04* | (2006.01) |
| *F16K 31/124* | (2006.01) |
| *F16K 31/122* | (2006.01) |
| *F16K 27/00* | (2006.01) |

(52) U.S. Cl.
CPC .......... *F16K 31/124* (2013.01); *F16K 27/003* (2013.01); *F16K 31/1223* (2013.01); *Y10T 137/6011* (2015.04); *Y10T 137/87193* (2015.04)

(58) Field of Classification Search
CPC ..... F16K 31/1223; F16K 31/124; B61K 7/02; B61K 7/08; Y10T 137/87885; B60T 15/027; F15B 13/0835
USPC .... 137/315.11, 247, 599.02, 596.17, 601.14, 137/597, 625.67; 303/118.1, 119.1, 303/119.2, 119.3, 128, 131.22
See application file for complete search history.

(56) References Cited

U.S. PATENT DOCUMENTS

| | | | |
|---|---|---|---|
| 3,227,179 A | 1/1966 | Rosaen | |
| 3,926,124 A | 12/1975 | Frank | |
| 4,357,463 A | 11/1982 | Blount | |
| 4,399,836 A * | 8/1983 | de Versterre | ........ F15B 13/0405 137/487.5 |
| 4,446,886 A | 5/1984 | Taylor et al. | |
| 5,884,985 A * | 3/1999 | Ganzel | .................... B60T 8/341 303/113.2 |
| 6,123,096 A | 10/2000 | Kammonen | |
| 6,453,936 B1 | 9/2002 | Frank | |

(Continued)

OTHER PUBLICATIONS

Ross Controls, Dale Series, CP, CX, LF, LX & LT, Manifold Compact Poppet Valves, Inline Poppet Valves, Leak Tight Valves & Manifolds, Bulletin 200, 2010, pp. 1, 3 and 4.

*Primary Examiner* — Reinaldo Sanchez-Medina
(74) *Attorney, Agent, or Firm* — Matthews Edwards LLC

(57) ABSTRACT

A retarder control valve assembly and system for controlling speed of rail cars, utilizes cartridge valves carried in a manifold body including piping and pilot control apparatus, but no wearing surfaces, dynamic seals, or moving parts. The cartridge valves are replaceable without replumbing, and include all moving valve elements and dynamic seals. The valves each include a piston controlled poppet carried on a spool movable within a cartridge body to open and close the valve and supported to withstand high side loads. The pressure sensing and feedback to the retarder system controller is at the manifold, in a pressure spike attenuating circuit having a phase modulating capability to mimic retarder pressure remotely.

16 Claims, 18 Drawing Sheets

(56) References Cited

U.S. PATENT DOCUMENTS

| | | |
|---|---|---|
| 7,140,698 B2 | 11/2006 | Braatz |
| 7,325,567 B2 | 2/2008 | Heyden et al. |
| 2004/0112208 A1 | 6/2004 | Kot, II |
| 2006/0192425 A1* | 8/2006 | Herbst .................. B60T 15/027 303/118.1 |
| 2006/0284480 A1* | 12/2006 | Rudolph ............... B60T 13/261 303/127 |
| 2008/0173840 A1 | 7/2008 | Godert et al. |
| 2008/0237511 A1 | 10/2008 | Heyden et al. |
| 2010/0319662 A1* | 12/2010 | Seiyama ............. F16K 11/0716 123/568.23 |
| 2012/0326495 A1* | 12/2012 | Trageser ................ B60T 8/368 303/119.2 |

\* cited by examiner

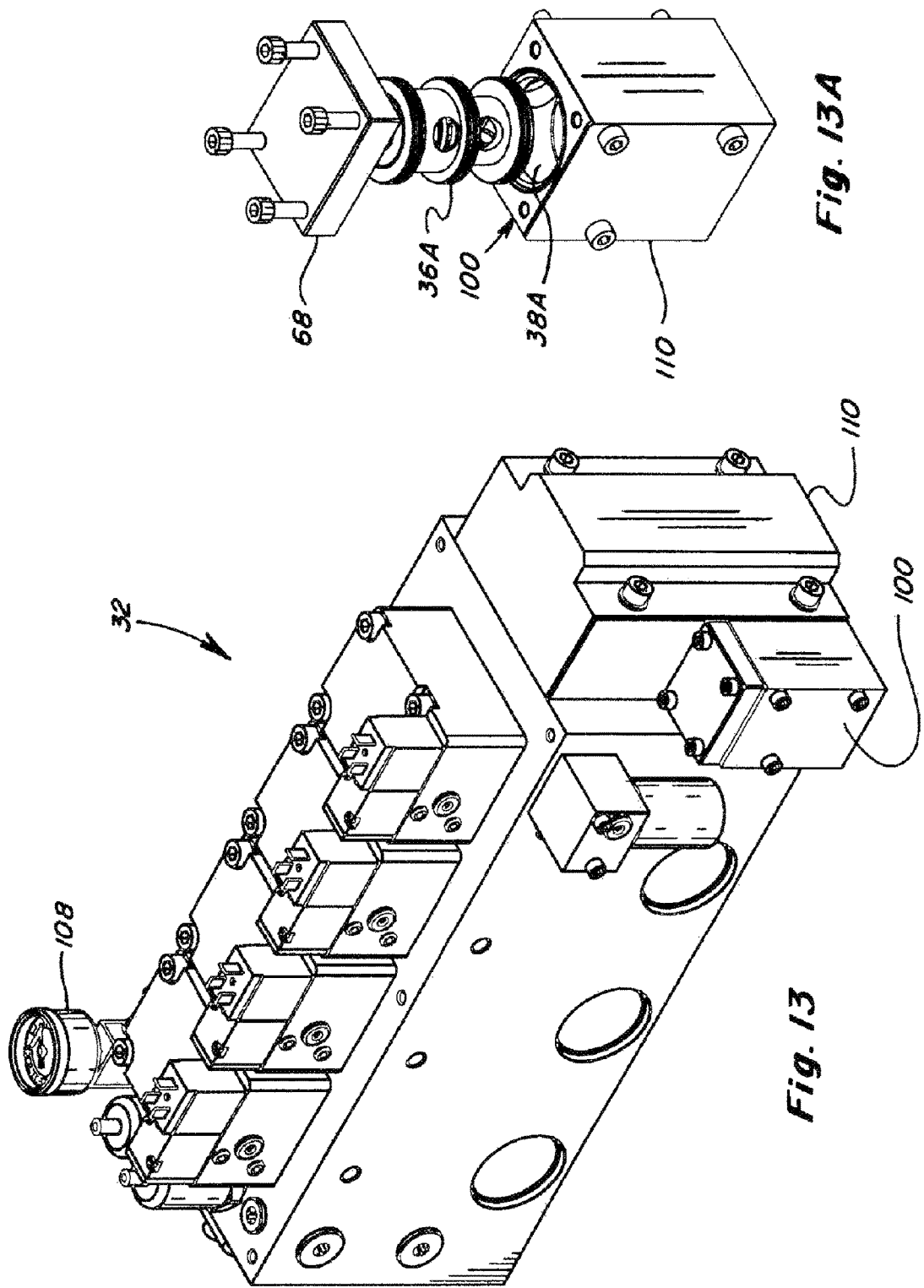

RETARDER CONTROL VALVE ASSEMBLY AND SYSTEM FOR RAIL CARS

This application is a division of co-pending U.S. patent application Ser. No. 14/533,679, filed Nov. 5, 2014, which application claims the benefit of U.S. Provisional Application No. 61/900,154, filed Nov. 5, 2013.

TECHNICAL FIELD

The invention relates generally to a retarder control valve assembly and system for controlling speed of rail cars, and more particularly, that is a low-maintenance alternative to existing valves and systems, by employing pilot-operated air valves wherein all or a substantial portion of the components of the valves, particularly those subject to wear, are incorporated into a cartridge that can be quickly removed and replaced without disconnection of a large number of lines or fittings, resulting in minimal down time for repairs.

BACKGROUND ART

The disclosures of co-pending patent application Ser. No. 14/533,679, filed Nov. 5, 2014, and U.S. Provisional Application No. 61/900,154, filed Nov. 5, 2013, are incorporated herein by reference in its entirety.

Railroad Pneumatic Retarder Control Systems

Railroad classification yards break incoming trains into individual cars at the top of a hump (hill) where they are weighed and identified. As a car rolls down the hump by gravity, it is switched onto one of many parallel tracks to form new train strings according to their destination. Car speed is monitored as it rolls down the incline and at several points it passes through a pneumatic retarder, or rail brake, where an appropriate degree of braking is applied to regulate the car speed in proportion to its weight. The objective is for the car to have enough momentum to complete its journey but not so much that cargo is damaged when it contacts and connects to the car before it in the stationary string. It is desired for the car speed to be regulated as precisely as practical, as a non-limiting example, within just a few fractions of a mile per hour, as a reference example, 3.5 miles per hour.

The retarder (brake) replaces a section of track and is constructed so that air cylinders or air-bag actuators work through a pincer mechanism to force brake pads into contact with car wheels as they pass through. A typical retarder has multiple individual mechanisms, which are operated in unison so that braking is uniformly applied as a car passes through. The degree of retardation (braking) is determined by the amount of air pressure supplied by the control valves. An inlet air valve is turned on to pass air to the retarder system until a particular pressure is achieved then the valve is closed to prevent additional flow which would cause overpressure. When the rail car has been sufficiently slowed, one or more exhaust valves are opened to exhaust or dump retarder pressure to atmosphere. Exhausting the retarder takes longer than filling it so multiple exhaust valves are commonly used to reduce exhaust time. But the more precisely the exhaustion can be controlled, the more precise will be the braking effect achieved. In a typical retarder control system, operating air pressures are as high as about 100 psi over atmospheric pressure. Pressure differentials of this magnitude have been found to be problematic, as they can result in high air flow velocities that can exert high load conditions on the valves, particularly exhaust valves, resulting in excessive wear and breakage requiring service or replacement more frequently than desired.

Railroads employ sophisticated computer software in the control tower to weigh the cars, monitor car speed and apply the proper amount of air pressure (including supply and exhausting of the pressurized air) to retarders in order to regulate the speed of each car even though several cars may be rolling separately down the incline in close sequence. Each retarder is actuated by a nearby control box typically trackside at each retarder where air valves are operated either directly by a signal from the tower or that signal may be further processed by a programmable logic controller (PLC) before operating the air valves. It is desirable for any new retarder valve or system to be compatible with this entire infrastructure.

Originally, retarder control air valve assemblies typically consisted of commercially available solenoid-controlled air valves and large, e.g., 1½" diameter, standard black iron plumbing components such as tees, elbows, unions and nipples and flanges. The result was a large, heavy, and difficult to mount assembly that was also difficult to maintain because large pipe wrenches were required for the 1½" joints and because the solenoid air valves were built with many loose components such as seals, springs, and screws that could easily be lost during on-site repair under difficult weather conditions (retarder control boxes are located outdoors alongside train tracks so weather can range from extreme heat to extreme cold, plus rain, sleet, or snow). The valve assembly was generally mounted underneath a hinged cover to protect the electrical components from the elements. The solenoids of air supply valves were accessible when the cover was lifted but exhaust air valves were mounted underneath the stand bottom so high-volume exhaust air could be vented to atmosphere outside the cover and away from the electrical components. Low ground clearance under the stand bottom made maintenance of exhaust valves even more difficult because of poor accessibility.

An improved generation of retarder controls positioned the air valves inside a protective metal box with a hinged lid and changed to double pilot-operated inline-style air valves that were suspended via unions and flanges between two large bar manifolds with bottom ports for air, exhaust and system connections through the box bottom. This was an improvement in that the valves and electrical solenoids were kept clean and were sheltered from weather conditions. However, to repair a valve it had to be removed along with its associated plumbing to be worked on. Another drawback was that the solenoid pilot valves required a filtered air supply and 4-way pilot valves were required to operate the double-acting main air valves. So, for example, a four-valve circuit might have a minimum of 10 tube connections for air supply pilot lines plus a minimum of 16 tube connections for valve exhaust lines—many of these lines would have to be disconnected in order to remove a valve for repair and any of these lines could leak and affect system operation.

Other commercially available valves were tried but the valves either reacted too slowly (ball valves) or were insufficiently rugged for this application and failed prematurely. Failure in the case of poppet valves was observed to be primarily due to the poppet not being effectively guided to resist the high side forces being generated by high velocity airflow through the valve. A further problem was a front-seated valve design that would shift open if pilot pressure was lost, even if the tower control signal called for the valve to remain closed. Still another problem is spring breakage, which can occur from repeated use under varying environmental conditions, and force loads that can be generated when shifting under high differential pressure conditions, and also when a spring has a design feature and/or manufacturing defect that gives it a propensity to breakage.

Typical modern pneumatic retarder control systems employ bulky commercially available air-piloted valves that are connected via conventional screwed or flanged pipe fittings to form a manifold assembly having an air supply port, one or more retarder ports, and one or more exhaust ports. These can include valve seats machined directly into the valve body and are not fully renewed by installing a rebuild kit so a new valve must be purchased and installed if a seat, or other wearing surface, becomes damaged. In order to replace an individual valve, pilot line tubing must be disconnected and several large pipe fittings must be undone to remove the valve from the manifold assembly.

Of course, conventional valves may be repaired on-site using a rebuild kit involving many loose parts, lubricants, and seals that can be easily lost or contaminated with grit from the rail yard. However, this doesn't completely renew the valve because valve seats, bearings, and piston bores located in the valve body are not replaced and may be in poor condition.

In addition, to make the large pilot-operated air valves controllable electrically, separate solenoid-operated pilot valves are connected via tubing and fittings. Commonly, two pilot tubes are required for each large controlled valve plus air supply tubing for each solenoid pilot valve. So, for a retarder control with four large 2-way valves there could be twenty pilot line tubing connections (fittings) plus another eight large plumbing joints (unions) for a total of twenty-eight potential leak points.

Reference in the above regard: U.S. Pat. Nos. 7,325,567 B2; 6,123,096; 4,446,886; and 3,227,179. Reference also U.S. Patent publications: 2008/0237511 A1; 2008/0173840; 2005/0005811 A1; and 2004/0112208 A1.

To protect the retarder control valves from inclement weather and extreme temperatures, it is common practice to mount the whole valve manifold inside an enclosure to keep the solenoids dry and also control temperature via heaters or fans. This requires multiple enclosure holes for connecting air supply, retarder connections, and exhaust mufflers—all of which should be sealed in order to exclude moisture and dust from the enclosure.

A segmented manifold may simplify manufacturing and reduce costs somewhat but that approach would build-in undesirable potential leak points at every air joint and pilot line joint between segments.

Any maintenance performed in a classification (hump) yard is expensive because safety rules and common sense requires a "watcher" to warn the worker of an approaching rail car. Because retarder controls are located at trackside there is no shelter from inclement weather so faster repair time is very desirable. Prior air valve designs have several common characteristics: they employ springs (internal or external) to return the valve to a "home" or rest position; the moving components such as spools and poppets are either not guided or an external bearing is required for alignment.

Poppet Valves

Large poppet valves are shifted by pilot air pressure acting on a piston which provides a high shifting force to the piston-spool-poppet assembly. Air flow capacity of a poppet valve is determined primarily by the diameter of the poppet and bore of the seat, and secondarily, by the distance the poppet moves away from the seat. As the poppet diameter is increased, to gain greater flow capacity, it becomes more critical that the poppet and seat be aligned so the closing force is spread uniformly over the entire circumference of the poppet. If any cocking or misalignment occurs, then the closing force is concentrated on a small initial contact area which can cause sealing problems and also shorten the life of the poppet seal which is typically rubber. Side loads are inherent in an air control valve because the air path typically involves a sharp or high angle turn, e.g., 90-degree turn, as it flows past the poppet—and the larger the poppet diameter, the larger are the side loads produced by high-speed air flow. This, combined with the high pressures used in retarder control systems cause the poppet to be pushed out of alignment with the valve seat, and also increases wear on the side load bearing components supporting the poppet, namely, the spool and associated structure. The resulting wear can also result in greater friction during movement of the poppet so that operation is less smooth. The known poppet valves are also known to suffer from the spring breakage issues noted above.

Typical known pilot-operated air valves in retarder control systems are operated by a pilot air signal from a small 3-way solenoid valve or other suitable valve. When the positive pilot air pressure becomes high enough, the large pilot-operated valve will shift. When the pilot air signal is exhausted to atmospheric pressure, the pilot-operated valve will be biased back to its home (normal) position by spring force. It is desirable to have a strong bias to home position to assure that no flow will pass through the valve that could cause a false retarder operation or cause the retarder brake shoes to prematurely move to closed position before a rail car is present so as to possibly cause a derailment or other problem. However, strong biasing springs can impart side loads to moving valve members and cause premature wear, and they can also pose a risk of injury to a mechanic during assembly or disassembly of the valve mechanism. In light of these and the other spring related problems discussed above, it would be desirable to eliminate springs from the valve assembly.

Typical modern retarders generally comprise a scissors or comparable mechanism incorporated between the rails of a section of track, the mechanism incorporating air cylinders, or more recently, multiple air bellows type actuators, inflatable by the pressurized air supplied by the retarder control valve or valves, to press brake shoes of the mechanism against the insides of flanges of the wheels of a rail car as they roll over the track section, to slow the speed of the rail car to a desired extent. The bellows type air actuators have a large air volume. The volume is such that the 1½" diameter hoses and piping connecting the bellows to the air valve manifold act as a restriction within the air flow system, both when inflating the bellows and exhausting the air therefrom. It has been found that having a restriction between the air valve manifold and the actuators results in delays between air valve operation and actuator response, typically manifold pressure being initially higher than pressure in the actuators when an air valve opens to pressurize the system. These pressures will equalize with time, as the higher pressure reaches the actuators. Similarly, manifold pressure will be initially lower than actuator pressure when an exhaust valve or valves open, but will equalize as the air is exhausted from the actuators. Thus it can be observed that there will be a phase difference between the pressures in the valves and the actuators until sufficient time passes for the pressures to equalize.

Pressure at the actuator(s), e.g., bellows is what determines the degree of retardation, and pressure feedback is required to enable precise control of air valves for controlling the air flow to and from the actuators. It would thus be desirable to locate a pressure feedback transducer or other sensor directly on or proximate to the actuator(s). However, this would place the transducer and attendant wiring vulnerable to weather and mechanical damage in a busy rail yard. To protect it and require less vulnerable wiring, it would be desirable to locate the transducer in or adjacent to the control enclosure and directly connect to the air valve manifold. But, direct connection to the air valves would potentially subject the transducer to any pressure spikes and shock waves generated when the valves open and close, and to the higher and lower pressures in the manifold compared to those in the actuator(s), due to the lag in pressure changes between the manifold and the actuator(s) from the piping restrictions, so that there is a danger of erroneous pressure signals being generated and responded to.

Thus, what is sought is an improvement in a valve arrangement for a retarder control system that overcomes one or more of the problems and shortcomings set forth above.

SUMMARY OF THE INVENTION

What is disclosed is a retarder control valve assembly and retarder control system that overcome one or more of the problems and shortcomings set forth above, by providing more robust construction for reduced wear and better resistance to poppet misalignment from side loading during operation, precise controllability, and an ability to more quickly completely renew or replace individual malfunctioning valves in a unitary manner, so that downtime and maintenance labor is minimized, and with involvement of a reduced number of fittings so that risk of air leakage and other problems are minimized.

According to a preferred aspect of the invention, the retarder control system utilizes a valve assembly comprising a multi-station manifold containing two or more cartridge valves that contain substantially all moving parts, seals and wearing surfaces, but with few or no loose parts that can be accidentally misplaced or lost during repair. The cartridge valves fit into a preferably monolithic manifold body where piping connection ports are provided but which contains no wearing surfaces, dynamic seals, or moving parts, including springs, so the manifold is essentially a static plumbing member, including the complete pilot air circuit necessary for operation. The cartridge valves are each preferably configured to include as a replaceable unit, a cartridge body about which are located necessary static seals, and within which are stepped bores which hold a piston member having both a pilot valve piston and a main piston. The piston member is connected to and carries a valve spool located in another portion of the cartridge body, and the spool carries apparatus for guiding movement of a poppet openable and closable for controlling air flow through the valve. Since substantially all moving parts and dynamic seals are contained on or in the cartridge valve, they are thus renewed when it is replaced. The cartridge valve is held in the manifold by a retainer which may be secured in a suitable manner, for example, but not limited to, using threaded fasteners such as screws, bolts, studs or the like, or a bail or bails, a clamp or clamps, etc. The retainer can be separate of or incorporated as a unit with the cartridge valve.

As an attendant advantage, the valve arrangement of the invention allows an individual valve station to be completely renewed by exchanging a new cartridge valve for an old one in only a few minutes. Troubleshooting time is virtually eliminated since a cartridge valve containing all wearing valve elements is so easily replaced and the connection of the pilot lines can be configured so that there is reduced possibility of connecting pilot lines incorrectly. As an additional feature, the cartridge valves are preferably configured such that the piston member can be shifted with or without any pressure to the valve other than pilot pressure, which eliminates need for springs, and allows interchangeable use of the valves to control either vacuum or positive air pressure and in normally open or normally closed modes. This also allows use of the same valve configuration for controlling both inlet air and exhaust purposes. The valves are also preferably configured such that, in the event of loss of supply air pressure, the valves will remain closed.

As another preferred aspect of the invention, the springless cartridge valves have been found to improve the life, safety, and reliability of the valve mechanism, as springs can fail from fatigue and other conditions, as noted above. The valve life is also improved by the elimination or reduction on the manifold of external vent passages to atmosphere that can draw in dust and other contaminants that can damage seals and other components.

As still another preferred aspect of the invention, the valve spool is configured so as to have elements for distributing side loads exerted against the spool and poppet which otherwise can be sufficiently great to cause misalignment of the poppet with its valve seat when the valve is closed. The load distributing elements are preferably embodied in an internal guide bearing that moves with the spool in contact with the cartridge body about a substantial portion of its inner periphery to positively align the poppet with the valve seat, distribute side loads and wear, and eliminate need for external valve spool support bearings which are a wear problem for some applications. A preferred guide bearing structure comprises vanes or ribs that connect to the spool, and with the bearing and spool bound and define air flow passages within the valve. The guide bearing also preferably is configured to remain at least substantially completely within the cartridge body during movements of the spool and poppet, so that the bearing contact surface area remains constant throughout the full valve movement.

As still another preferred aspect of the invention, reliability of the retarder valve system is further improved by incorporating the pilot circuit or portions thereof within a segmented or monolithic manifold so that all or most external tubing and connectors for pilot lines, air filters, etc. and their associated potential for leakage or breakage are eliminated, or at least will not need to be disconnected and reconnected with the replacement and renewal of the valve.

By installing two or more self-contained cartridge valves in the manifold, several of the previously discussed problems are eliminated and all the benefits of the cartridge valve manifold are preserved.

As one benefit, the manifold base becomes a static component of the retarder plumbing so it does not have to be removed or disturbed in order to repair a valve. One or a small number of manifold ports are provided for retarder connections to minimize the number of external pipe fittings and joints which may leak.

As another benefit, the pilot air supply is routed internally from the main air supply to the manifold, passes through a check valve and replaceable air filter, and is then fed to an internal galley to supply pilot air to all cartridge valves and solenoid pilot valves. The check valve serves to trap air pressure within the pilot passages when inlet air pressure momentarily drops when an air supply cartridge valve suddenly opens. In the preferred embodiment, there are no external pilot lines, tubing, nor tube fittings. Cartridge valves may be used without modification to control either pressure or exhaust air, and valve function is determined solely by how air passages are connected within the manifold.

As another preferred aspect of the invention, the cartridge valves are controlled by pilot control devices, which can be solenoid pilot valves, air controlled valves, servos, or other suitable air flow control devices, mounted to the retaining caps which project from the manifold surface or other suitable locations in proximity to the valves to be controlled. This arrangement allows the manifold to be mounted in connection with an enclosure such as a control box so all large-diameter air supply and retarder connections are accessible external to the enclosure. Cartridge valve retaining caps, pilot control devices, and the piston-end of the cartridge valves can be mounted through a surface or panel of the box, such as, but not limited to, the box bottom, so they can be in a more controlled environment, e.g., heated in cold climates and cooled, if necessary or desired.

As another preferred aspect of the invention, solenoid pilot exhaust air is discharged outside of the control box, such as by passage through the manifold, to atmosphere so that electronic controls within the box are kept clean.

According to another preferred aspect of the invention, the manifold includes associated pressure sensing and feedback apparatus, pressure transducer or transducers, incorporated in a pneumatic pressure spike attenuating circuit with a phase modulating capability. This is advantageous as it reduces the possibility of damage to the transducer(s) and wiring from weather and track hazards, by virtue of its location in association with the manifold and valve assembly instead of with the actuator(s). The phase modulating capability allows the circuit to better align the sensed manifold pressure with retarder pressure, both timing-wise, and in relative magnitude, for a more accurate transducer feedback signal to the control computer, including when pressure spikes and other transient pressure conditions, e.g., associated with and resulting from valve opening and closing, are present.

As still another preferred aspect of the invention, the manifold may be configured to include one or more air inlet valves and one or more exhaust valves. The air inlet valve receiving cavities can be made to provide restricted flow or full flow. Exhaust valves can be ported for individual exhaust mufflers or, to reduce back pressure, the flow from multiple valves can be channeled to a common passage or galley where exhaust air passes to atmosphere directly, for instance, through one or multiple mufflers or baffle plates.

As still another preferred aspect, fail-safe operation may be achieved via redundancy by using one primary air supply valve and one or more back-up air supply valves that are only operated in event of a primary valve failure. Similarly, multiple pressure transducers may be used, preferably in a primary and back-up configuration, and again are incorporated into the pressure spike attenuation circuit for the protection afforded by the location remote from the track.

As still another preferred aspect, the valve assembly of the invention can include an automatic retarder pressure vent for reducing high pressure conditions in the event of loss or reduction of air supply pressure, and which can be configured as a cartridge air valve quickly and easily removable and replaceable for complete renewal. As another preferred aspect, the cartridge valve can be configured such that the valves used for both inlet air control and exhaust control can be of the same construction, so as to be interchangeable and reduce the number of different parts required for repair and/or replacement.

BRIEF DESCRIPTION OF THE DRAWINGS

FIG. 3A is a front view of the valve assembly of FIG. 3;

FIG. 3B is a top view of the valve assembly of FIG. 3;

FIG. 3C is a side view of the valve assembly;

FIG. 3D is another side view of the valve assembly;

FIG. 3E is a bottom view of the valve assembly;

FIG. 3F is a rear view of the valve assembly;

FIG. 10A is a perspective view of the cartridge valve of FIG. 10;

FIG. 13 is a perspective view of another embodiment of a valve assembly of a retarder control system, incorporating an optional automatic retarder pressure vent according to the invention;

FIG. 13A is a perspective partially exploded view of aspects of the automatic retarder pressure vent of the valve assembly of FIG. 13, to show removal/installation of a representative cartridge air valve of the vent;

DETAILED DESCRIPTION OF THE INVENTION

Figure 1:
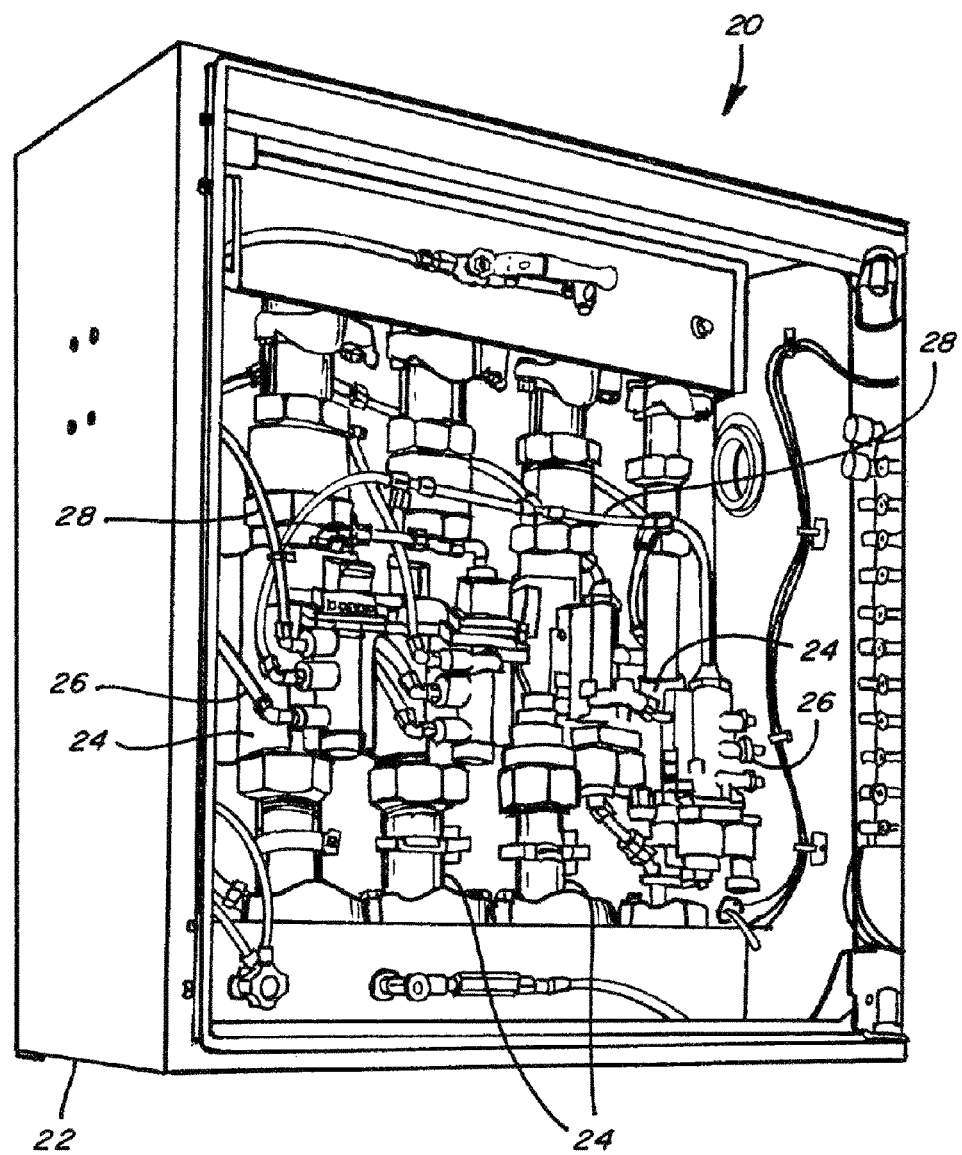
FIG. 1 is a perspective view of a control box containing a representative prior art valve arrangement of a retarder control.

Referring to the drawings, several preferred embodiments of valve assemblies for a retarder control system according to the invention are shown. In FIG. 1, a typical representative prior art valve arrangement 20 and control box 22 are shown, including multiple individual pneumatic valves 24, here a total of four, controllably operable by pilot control devices 26 and associated external pilot control lines 28, all contained in box 22. Each valve 24 is located entirely in box 22, and is separately connected via flanges, slip joints, and unions, to plumbing lines located above and below the valve in connection with manifolds above and below the valve, and it can be observed that these numerous connections must be variously disconnected and reconnected for valve replacement. This arrangement is representative of retarder control valve arrangements found in a variety of railroad yards. Generally, in operation, retarder pressure control is achieved digitally via one or more air supply valves and one or more exhaust valves, connected via piping and hoses to a sequence of air operated retarders incorporated into a section of downwardly inclined yard track, and configured for reducing the speed of a rail car as it moves along the track and approaches a rail car to which it is to be coupled. Typically, it is desired to slow a rail car to a relatively precise speed, e.g., 3.5 miles per hour, plus or minus a few tenths of a mile per hour by operation of the retarder control system. A typical air pressure for operation will be about 100 psi.

Figure 2:
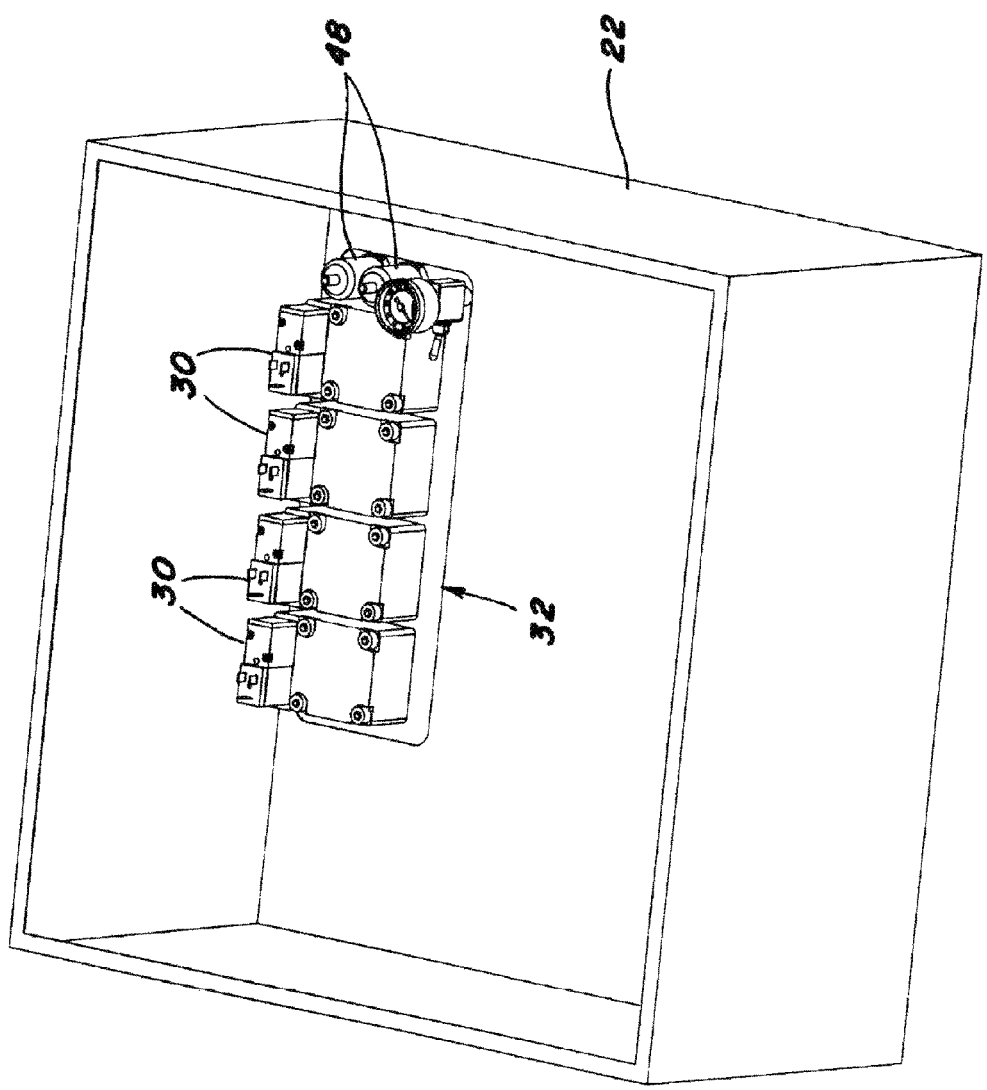
FIG. 2 is a perspective view of a control box, similar to the box of FIG. 1, containing elements of one embodiment of a valve assembly of a retarder control system according to the invention.

FIG. 2 shows a similar control box 22, containing only pilot control devices 30, along with an associated pressure gauge and two transducers 48 of a pressure spike attenuator circuit 118 of the invention, all associated with a representative air valve assembly 32 constructed and operable according to the teachings of the present invention and discussed in greater detail below. According to a preferred aspect of the invention, the pilot control devices 30 are located within a control box 22 for limiting exposure to environmental contaminants, e.g., dust, rain, snow, hail, etc., and potential resulting damage, and the associated valves of valve assembly 32 are located in a valve manifold, that can be located externally to box 22. Box 22 will be substantially sealed by a cover (not shown) over the opening revealing the devices 30, to keep the interior clean and protected. As an advantage of the invention, the valves of valve assembly 32 can be removed from the associated manifold through the clean, protected environment of box 22 and replaced quickly, with all air flow passages and lines remaining intact, that is, without requiring disconnection of numerous pilot control and plumbing fittings and resulting potential leakage and other problems. This allows maintenance crews to fix a valve problem quickly so that rail car sorting can resume, and the repairman can go on to the next task. This arrangement also allows the manifold to be located outside of the control box so all large-diameter air supply and retarder connections are accessible externally.

Pilot control devices 30 can comprise any of a variety of valve control devices, such as, but not limited to, well known, commercially available solenoid operated pilot control valves, air operated pilot control valves, servo controllers, or customized or custom made devices, as desired or required for a particular application. For a typical retarder control application, the manifold can be configured to include one or more air valves for inlet air control (air flow to the retarder) and one or more for exhaust control (air flow from the retarder).

Figure 3:
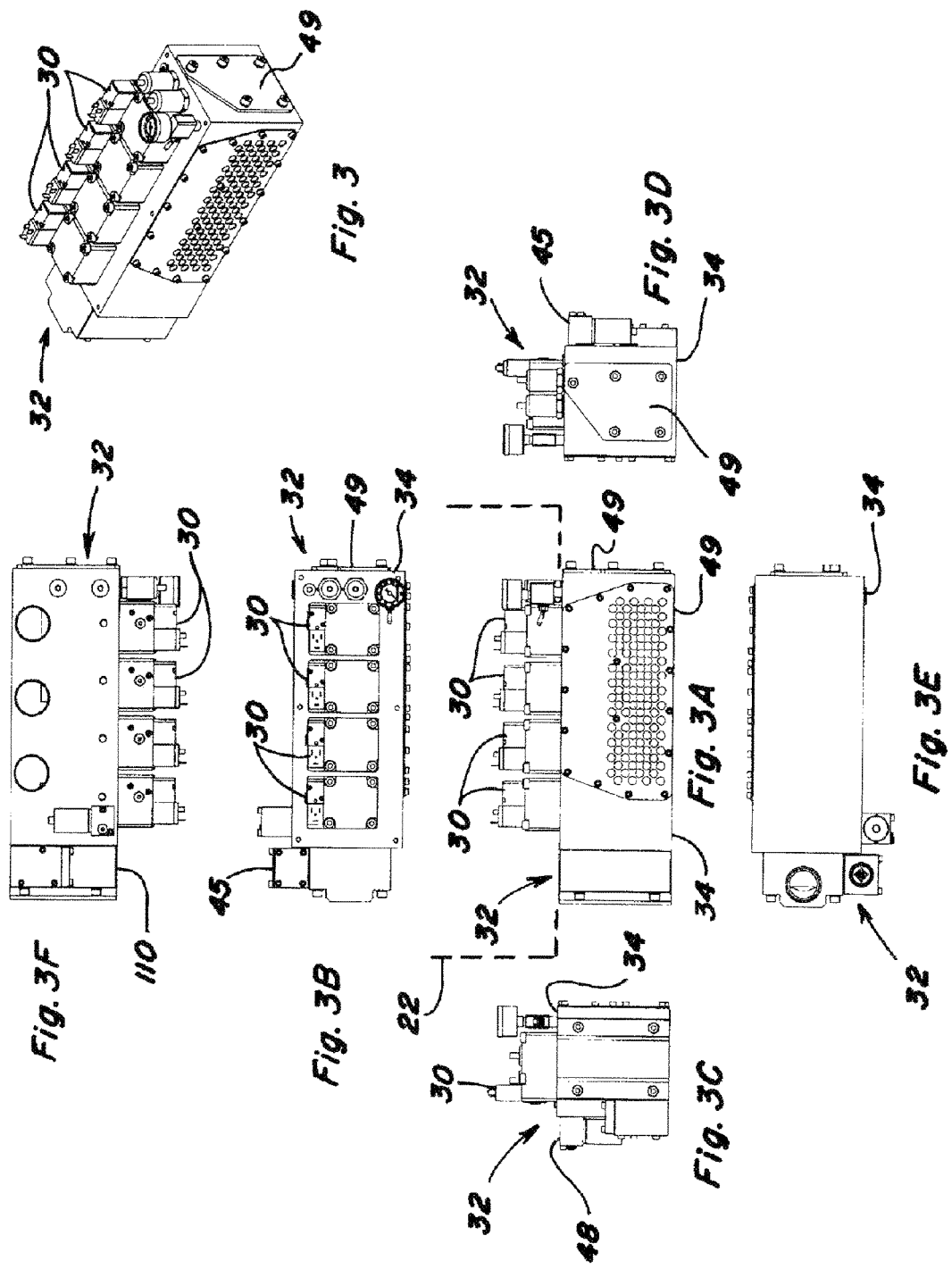
FIG. 3 is a perspective view of an embodiment of a valve assembly for a retarder control system according to the invention.

FIGS. 3; 3A-F; and 4 show aspects of a representative four air valve assembly 32 of the invention, including four external pilot control devices 30 (one each for four air valves 36) mounted on a manifold 34. FIG. 5 is a schematic view showing valve assembly 32 incorporated into a representative retarder control system 40 in connection with a supply of compressed air from a compressor at the required operating pressure, identified collectively by the reference number 114 and of well known commercially available construction, and in connection with one or more retarders 116 also of well known commercially available construction, that will be incorporated into a section of rail in a yard or other location in the well known manner. These connections will be made using suitable piping, e.g., using 1½ inch pipe, hoses, and fittings or the like. Each air valve 36 is configured as an individual cartridge located within an individual air valve receiving cavity 38 (FIG. 4) within manifold 34, and can be configured to provide restricted air flow or full flow at the system operating pressure, e.g., 100 psi or so. Exhaust control air valves 36 can be ported through a common exhaust galley or passage 42 (FIG. 5), preferably located at least substantially or completely within manifold 34 so that exhaust air passes to atmosphere through a vented cover plate 112 over exhaust passage 42, or through multiple mufflers (not shown), as desired or required for a particular application.

As a preferred installation, manifold 34 will be located external to an associated trackside control box such as box 22 (illustrated in dotted lines in FIG. 3A), and control devices 30 and caps 68 will extend through a sealed hole in a surface of the box so as to be located within the box, although this is not a required configuration. As an advantage, when an air valve 36 is to be removed from manifold 34, the associated cap 68 is detached from the manifold to open the associated air valve receiving cavity 38 in the clean environment of the box 22, and there is sufficient space within box 22 to remove the valve from the manifold and replace it, while all plumbing fittings remain connected and all pneumatic passages remain intact, that is, without requiring disconnecting and reconnecting or otherwise involving a single air fitting. As a non-limiting example, a box having dimensions of about 24 inches by about 24 inches by about 12 inches deep will provide adequate space for removal and installation of four or so air valves 36 of the present valve assemblies, through an appropriate hole in any panel of the box. Thus, all of the valves 36 can be removed and replaced, with all air lines and pneumatic fittings remaining in place, connected, and intact. If sufficient line or wire length is present, changing a valve may be done without removing the associated wiring harness (if electrically controlled), air line(s), or other control or power lines from devices 30, so valve change out can be achieved very quickly, for example, in about 5 minutes or so, with reduced possibility of leakage or misconnection of air fittings.

Pilot air exhausted from pilot control devices 30 is routed through manifold 34 via exhaust passages 44 within manifold 34, to either pilot air exhaust mufflers 46 mounted externally thereon, as shown in the schematic of FIG. 5, or to a vented cover plate, e.g., plate 112, so as to be discharged externally of box 22, also, for maintaining cleanliness of the interior, so that substantially no system air enters box 22 during operation.

Control system 40 includes a processor based computer 120 which can be of conventional, well known commercially available construction, connected in operative control of pilot control devices 30, and to at least one, and here, for redundancy preferably two, pressure transducer(s) 48, for receiving pressure signals therefrom, via conductive paths 60, which can comprise, but are not limited to, wires of a wiring harness, a wireless communications network, or the like. In operation, control system 40 will monitor pressure feedback via the pressure signals, and responsively output command signals to devices 30 for controlling valves 36 as required for achieving a desired pressure. As a simple operative example of how the feedback is used, if transducer(s) 48 indicate(s) a high pressure, computer 120 can automatically operate one or more of the air exhaust valves 36 to release some of the air contained in the system. If pressure is low, the computer can operate the air inlet valve(s) 36 to increase pressure. The computer will incorporate various algorithms for achieving desired retarder pressures, as required for a particular application, in the well known manner.

Ideally, the monitored or feedback pressure utilized by the controller would be the pressure within the retarders 116, as close in time as possible to the occurrence of that pressure. That is, the feedback pressure would be representative both in magnitude and in phase or timing, e.g., in or close to real time, to the actual retarder pressure. However, as discussed above under the Background Art heading, the actuators of retarders 116 will typically comprise several air bellows, air cylinders, or other air operated apparatus of scissors or similar mechanisms, incorporated into a section or sections of track, so that any associated transducers, sensors, or the like, will be exposed to weather, track hazards, and possible resultant damage, making that an undesirable location for practical reasons.

Monitoring pressure at the manifold 34 as an alternative provides the ability to better protect the sensors, here, transducer(s) 48, from trackside conditions and hazards. However, because of the distance involved and presence of the restriction(s) of the piping between the transducer(s) 48 and the retarders, there will naturally be both a magnitude difference and a timing or phase lag between pressure in the manifold and that in the retarders under dynamic conditions such as during and just after valve opening or closing. As a representative range of distance, the length of the piping and hoses connecting manifold 34 to the retarders 116 can be several feet. The phase or timing lag will also be a function of the magnitude of the initial pressure differential between the manifold and the retarders when the valve(s) is/are opened.

Transient pressure spikes and drops, and resultant shock waves generated when the valves 36 are initially operated are also a factor. For example, a pressure spike of up to the maximum operating pressure, e.g., 100 psi, can occur when the air inlet valve or valves is/are initially opened and the receiving cavities are at or near atmospheric pressure, and a large pressure differential can exist between the manifold and the retarders for some time after the initial operation as the spike is dissipated. If the pressure sensing apparatus, such as transducers 48, are directly exposed to the pressure spikes and/or shock waves, they may send erroneous and/or undesired signals to the computer. In the latter regard, this can take the form of a high pressure signal, but which is present for only a short time, and will not be present at the retarder actuators in its full magnitude. Similarly, a pressure drop of as much as 100 psi can occur when the exhaust valve or valves is/are initially opened and a subsequent high pressure differential between the valves and retarder actuators can again exist for some time until equalization of pressures occurs. In this instance, the higher pressure will be in the actuators, but the lower pressure is again only transient, and is not desirably a feedback condition on which valve operation is desirably based.

To take advantage of the protection provided by a remote location from the retarder, and by control box 22, transducers 48 are preferably connected or mounted to manifold 34, in or proximate to control box 22. To protect them from the pressure spikes, drops, and shock waves variously generated by operation of valves 36, transducers 48 connect to a main air passage 50 of manifold 34 via a pressure spike attenuator circuit 118 of the invention. Main air passage 50 is preferably located in or on the manifold and connects air valves 36 to retarders 116 via the piping and hose connections. Circuit 118 is configured to attenuate the pressure spikes in a manner to prevent damage to the transducers 48. Circuit 118 is additionally configured such that the pressure conditions to which the transducers 48 are exposed, relatively closely mimic or follow the pressure conditions at the actuators of the retarders. both in magnitude, and in timing. As a result, multiple advantages are achieved, the transponders are protected from environmental damage and pressure spikes, and are exposed to a pressure condition that relatively accurately reflects that in the actuators, in real time or near real time, so that the controller has more accurate feedback on which to base valve operation. As a result, the controller is able to make pressure adjustments based on pressure data that better correlates to the actual pressure conditions reached in the retarders, and better retarder operation and rail car speed control is achieved.

Here, pressure spike attenuator circuit 118 includes a restrictor 142 connecting it to main air passage 50, and a larger volume pressure normalizing chamber 144, to which transducers 48 are connected or exposed. Circuit 118 additionally includes an optional air filter 45 between restrictor 142 and main air passage 50. Restrictor 142 can comprise an orifice, or orifices, and/or a baffle or baffles, and can be fixed, or variable or adjustable, e.g., a variable orifice. Pressure normalizing chamber 144 can comprise one or more cavities or passages, which can also, or alternatively, be fixed in volume and/or shape, or variable or adjustable. Together, restrictor 142 and chamber 144 can be optionally configured or configurable to be adjustable or tunable, for achieving the desired or required spike attenuation and pressure levels that mimic or accurately match those in the associated actuators of retarders 116, either or both timing- or phase-wise, and magnitude-wise. In this regard, it has been found that the restrictor 142 can be configured to perform a significant portion of both the attenuation and phase modulation or matching of the timing of the pressure in chamber 144 and the retarder actuators. As an alternative according to the invention, restrictor 142 can be configured to perform the filtering function as part of its restrictor function, so as to eliminate need for a separate filter 45, such as by making the restrictor in a sintered construction providing interstices of a particular size or air permeability, to provide a sufficiently indirect or tortuous air flow path for achieving its component of the desired or required pressure spike attenuation and matching to the retarder pressures. In this regard, because different applications will have different numbers and/or types of retarder actuators, air supplies, piping sizes, lengths, routing, and other conditions, etc., and environmental conditions will be changing, the ability to precisely adjust or tune the attenuation and pressure conditioning for the transducers, is an advantageous feature of the invention.

Manifold 34 here is plumbed to include one external main air supply port 52 in connection with a main air supply passage 54 extending through the manifold to the inlet air valve 36 (leftmost valve in FIG. 5). The pilot air supply is connected internally within manifold 34 to the main air passage 54 via a pilot air supply passage 56 or galley, that passes through a check valve 43 and replaceable air filter 45 (FIG. 5), to supply pilot air to all of the air valves 36 and pilot control devices 30. The check valve 43 serves to trap air pressure within the pilot air supply passages when inlet air pressure momentarily drops due to high inrush flow when an air inlet cartridge valve or valves suddenly opens. With these internal air passages, it is demonstrated that the valve assemblies of the invention can be configured with no external pilot lines, tubing, nor tube fittings.

Figure 4:
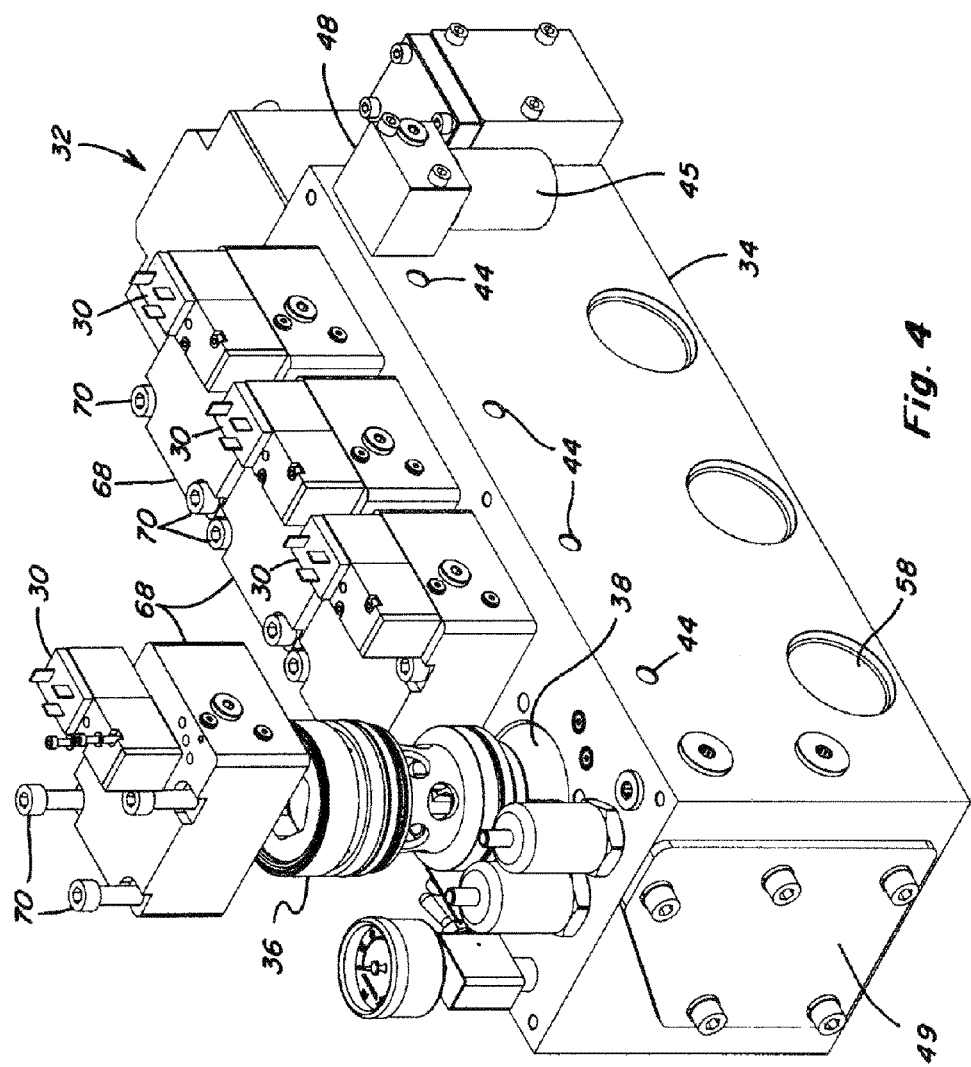
FIG. 4 is a perspective partially exploded view of another embodiment of a valve assembly for a retarder control system according to the invention, showing removal/installation of a representative cartridge air valve of the assembly.
Figure 5:
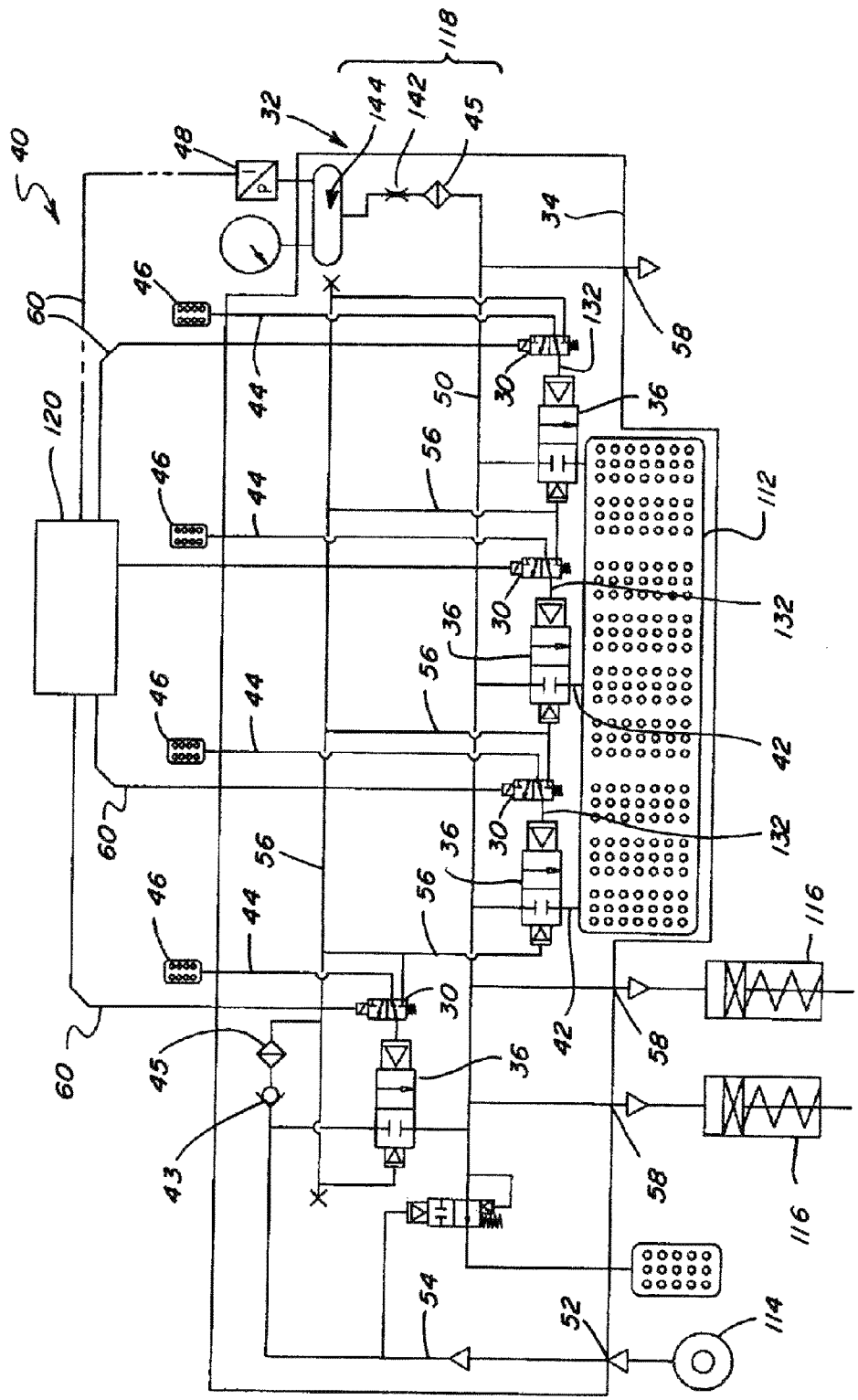
FIG. 5 is a simplified schematic view of an embodiment of a pneumatic circuit of a retarder control system incorporating the valve assembly of FIG. 4.
Figure 6:
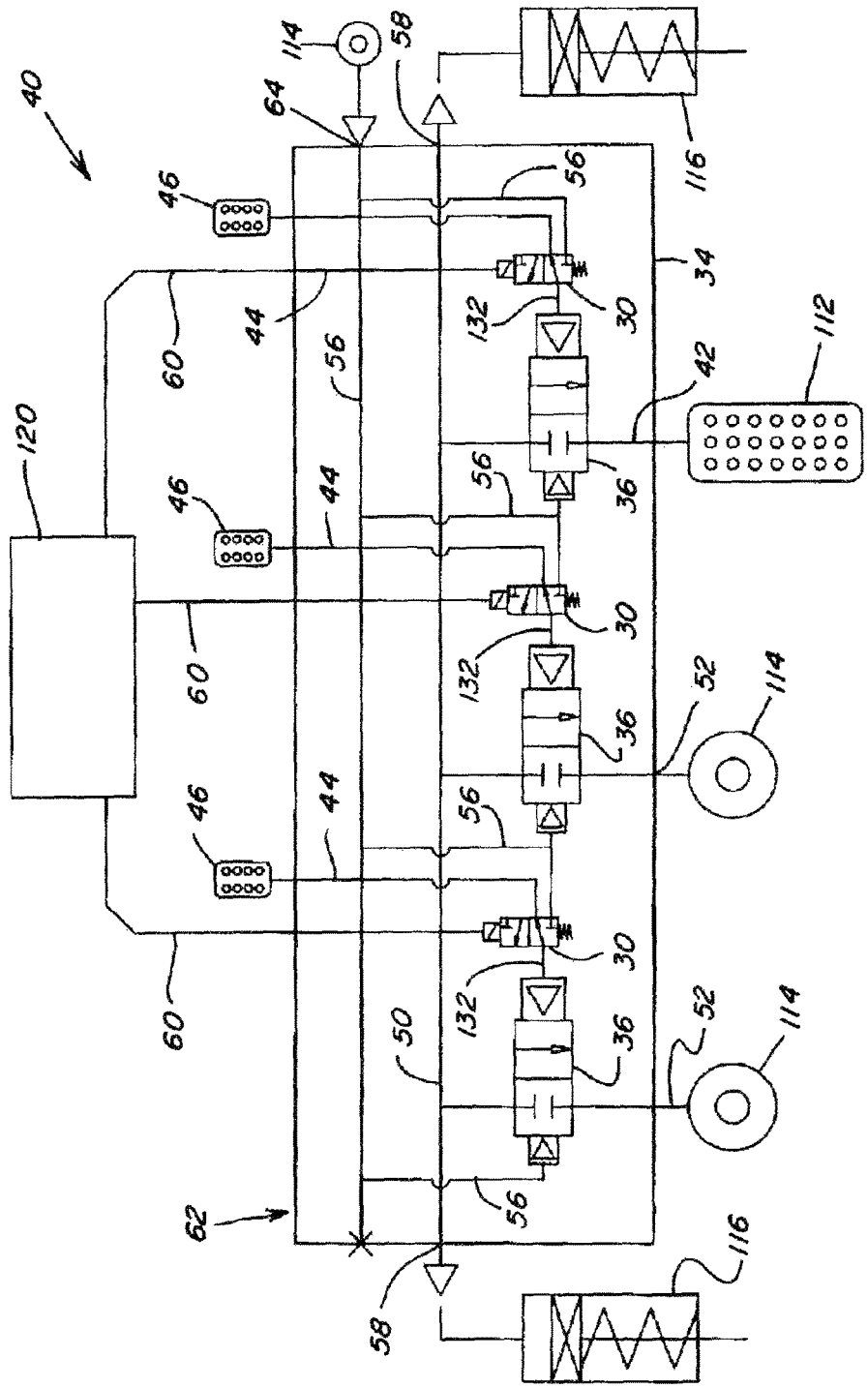
FIG. 6 is a simplified schematic view of another embodiment of a pneumatic circuit of a retarder control system according to the invention.
Figure 7:
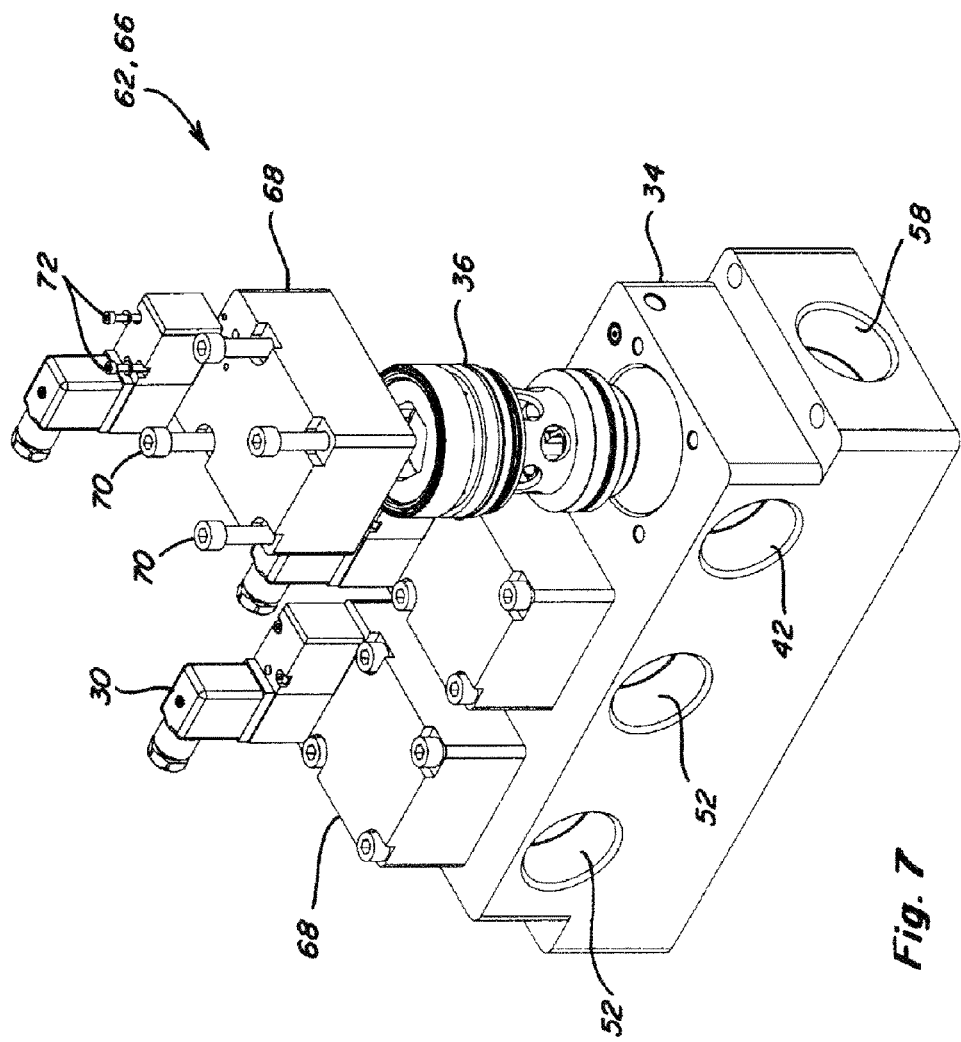
FIG. 7 is a perspective exploded view of a valve assembly for the system of FIG. 6.

Main air passage 50 is connected to an external retarder port or ports 58 that can be located at one or more locations on manifold 34, here, as non-limiting examples, two end located ports 58 on the manifold 34 of FIGS. 6 and 7; three side located ports 58 on the manifold of FIGS. 3F, 4 and 5, and port or ports 58 are connectable to a retarder or retarders 116 via conventional plumbing, all of which will be external to manifold 34. Retarder ports 58, as well as air supply port 52 can comprise ports machined into manifold 34 if, for instance, in the form of a member or block of metal, plastics, or other material. The air valve receiving cavities 38 and various passages and ports for attachment of pilot air exhaust mufflers 46 can be machined, cast, or otherwise suitably formed in or on manifold 34 also. Main air supply port or ports 52 and retarder port or ports 58, can likewise be machined or positioned on manifold 34 at various locations, as desired or required for a particular application, e.g., as non-limiting example, an end location, and/or a side location as shown in FIG. 7. If desired, manifold 34 can be configured to have a variety of ports, that can be plugged or covered if not used, to provide alternative options for different configurations, as illustrated by cover plates 49 shown on ends/sides of manifold 34 in various of the FIGS., and the various internal passages, e.g., passages 50, 54, 56, 58, can be routed through the manifold 34 as required or desired for a particular application.

Pilot control devices 30 and pressure transducer 48 are connected in communication with a source of power and computer 120 via suitable conductive paths, such as but not limited to, wires of a wiring harness, a wireless network, controller area network, or the like, as collectively denoted by numeral 60. Again, it should be noted that devices 30 are not limited to solenoid operated apparatus, but could be any kind of pilot signal (e.g., air, hydraulic, etc.) controlled devices.

As another advantage of the invention, air valves 36 can be configured to be used without modification to control either pressure or exhaust air, so as to be interchangeable, if desired. Alternatively, the different valves can be of different sizes or air capacity, as desired or required for a particular application. Valve function is determined at least in part by how air passages are connected within manifold 34. If the passages are fixed, that is, integrated into the manifold itself, confusion when changing valves is eliminated.

Referring also to FIGS. 6 and 7, a pneumatic circuit of a retarder system 40 incorporating an alternative valve assembly 62 according to the invention, are respectively shown, like parts of assembly 62 and assembly of the previously discussed FIGS. being identified by like numerals. Valve assembly 62 utilizes a manifold 34 containing three air valves 36, configured as two air inlet valves and one air exhaust valve. It is usable if desired with a suitable enclosure such as control box 22 (FIG. 2), and can be incorporated into a retarder system 40 such as shown in the schematic of FIG. 6 in the manner discussed above, namely by connection via suitable conductive paths 60 to a computer 120, to compressed air supply 114, and a desired number of retarders 116. Assembly 62 can also include a pressure spike attenuator circuit 118 (see FIG. 5). As an advantage, one of the air inlet valves 36 can be designated main or primary, and one auxiliary, for use as a failsafe in the event of failure of the main. The inlet valves 36 can be jointly connected to one air supply port 52, or separately to two, as shown, in connection with a supply of compressed air 114. The main air passage 50 can connect with one or more retarder ports 58 in connection with a retarder or retarders 116, two of which are shown. The valve 36 used as an air exhaust valve will connect via an exhaust passage 42 and optional exhaust galley to atmosphere through a vented cover plate 112 or exhaust muffler. This embodiment as shown has a separate, external pilot air supply port 64 in connection with a supply of compressed air 114 and pilot control devices 30 of the valves 36 via a pilot air supply passage 56, and separate pilot air exhaust ports 46 with optional mufflers connected to the devices 30 via pilot air exhaust passages 44. Pilot air can alternatively be supplied by an air supply port or ports 52, and the air passage can be external, or internal passages, such as explained above, again to reduce potential leak points, if desired or required for an application. If identical, the respective functions of the three air valves 36 can be determined solely by whether they are connected to a compressed air supply or allowed to exhaust to atmosphere. As an advantage, because an auxiliary valve is in place, if the main air supply valve fails or falters, the auxiliary valve can be used, to extend the service life or forego repair of the assembly.

Figure 8:
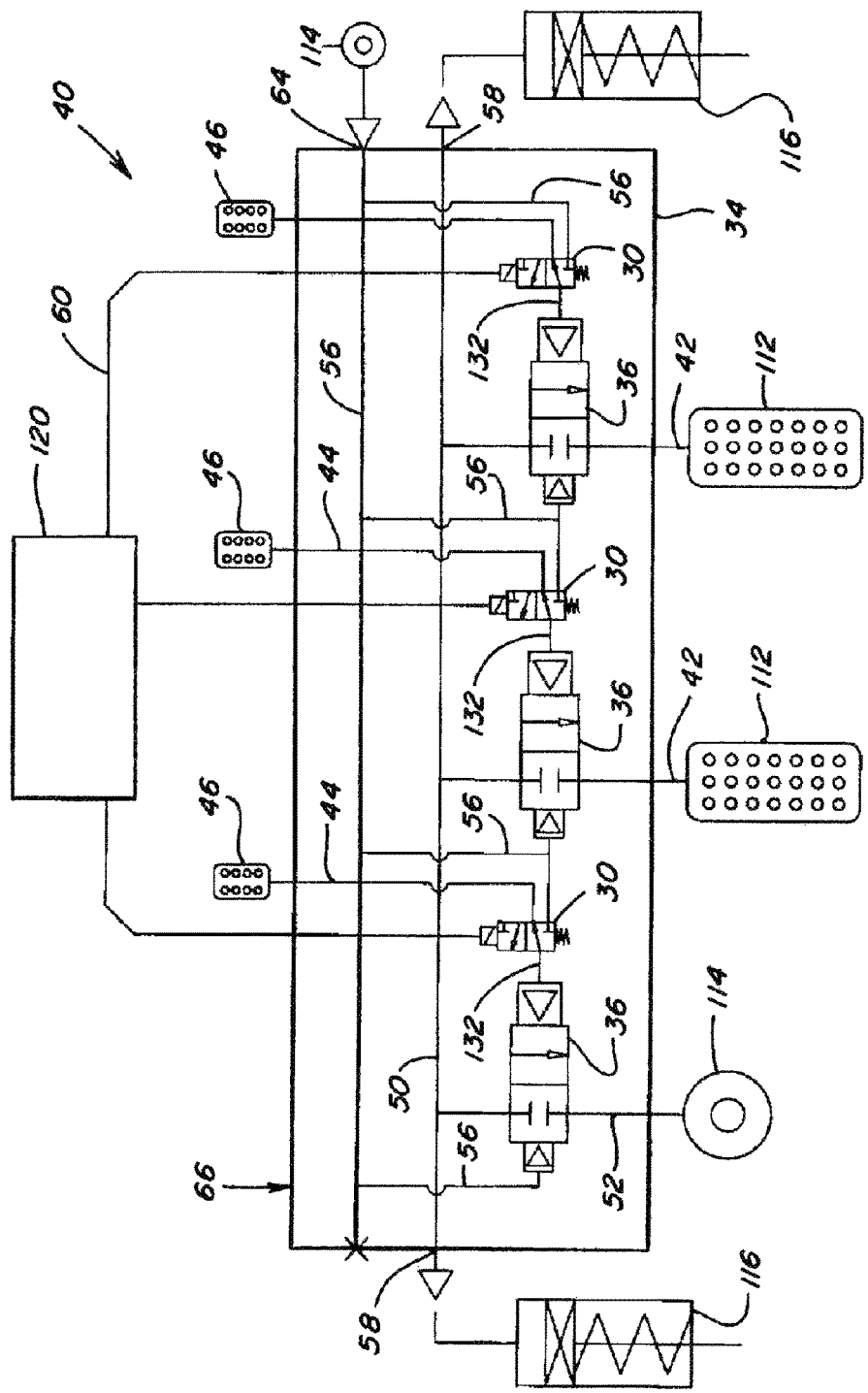
FIG. 8 is a simplified schematic view of still another embodiment of a pneumatic circuit of a retarder control system according to the invention.

Referring also to FIG. 8, a schematic of pneumatic circuitry of a retarder control system incorporating another alternative valve assembly 66 according to the invention is shown, like parts of assembly 66 and assemblies of the previously discussed FIGS. being identified by like numerals. This embodiment again utilizes a manifold 34 containing three air valves 36, but is configured as one air inlet valve and two air exhaust valves. The air inlet valve is connected to an air supply port 52 connected to a supply of compressed air 114, and the exhaust valves connect to two exhaust passages 42. The main air passage 50 can connect with one or more retarder ports 58, two being shown, in connection via suitable plumbing to a retarder or retarders 116 as illustrated, as part of a retarder system 40 as shown, namely by connection via suitable conductive paths 60 to a computer 120, to complete the system. Assembly 62 can also include a pressure spike attenuator circuit 118 (see FIG. 5). This embodiment also includes a separate, external pilot air supply port 64 in connection with pilot control devices 30 of the valves 36 via pilot air supply passage 56, and separate pilot air exhaust mufflers 46 in connection with devices 30 via pilot air exhaust passages 44, which passage can be external, or internal to provide the above mentioned advantages. Again, pilot air can alternatively be supplied by air supply port 52 via a suitable external or internal passage, in connection with a supply of compressed air 114 such as explained above, to reduce potential leak points. Also again, here, because the air valves 36 are the same, the respective functions of the three valves 36 is determined solely by whether they are connected to a compressed air supply or to atmosphere and their respective pilot control configurations. FIG. 7 is also representative of the valve assembly 66 except for the number of valves devoted to air supply and exhaust purposes, respectively.

As another aspect of the invention, the advantage of the ability to quickly change air valves 36 can be achieved with other manifold structures incorporating one or more of the above disclosed ports and/or passages. Thus, it is contemplated that one or more of air passage 50, air supply port 52, passage 54, passage 56, and/or port 58, as well as external pilot air supply port 64, can be incorporated into the manifold, e.g., internally, or configured as an external item, such as a external pipe or tube, or fitting, as long as required communication with air valve receiving cavity or cavities 38 is/are provided. Thus, as a non-limiting example, cavities 38 can be provided in jug, bottle, cylindrical, etc., shape bodies or structures, jointly or individually, with appropriate lines, attached or integrally formed, connecting them to provide the necessary air flow and exhaust capabilities, while allowing removal and replacement of the valves 36 without disconnection of air flow lines, pilot lines, etc. Because any such lines, fittings, etc., incorporated into the bodies do not require disconnection or reconnection for replacement of the valve or valves 36, at least some advantages of the invention are achieved.

As another aspect of the quick change capability, in the non-limiting embodiments shown, pilot control devices 30 are incorporated onto caps 68 that mount to manifold 34 separately from valves 36 with suitable fasteners, such as, but not limited to, screws 70, bolts, studs, or other threaded fasteners, threadedly engageable for instance with threaded holes in manifold 34. As alternatives, a bale or bales, a clamp or clamps, or the like, could be used. Caps 68 sealably enclose air valve receiving cavities 38, and retain valves 36 therein. A suitable seal member, such as an O-ring or gasket (not shown) can be provided between the surfaces of cap 68 and manifold 34, and an alignment device or devices, e.g., guide pins, can be provided, as required. As another alternative, caps 68 can be incorporated into a unit with valves 36, respectively. Pilot control devices 30 can be suitably mounted, for instance, using screws 72 threadedly receivable in caps 68, or another manner of attachment such as just mentioned. Alternatively, devices 30 can be separately attached, for instance, directly to manifold 34 or another structure associated with the cavities 38, if desired. By optionally locating devices 30 and caps 68 within box 22 as described above, they can be environmentally controlled, e.g., heated or cooled if desired using an appropriate device with that capability (not shown).

As a preferred aspect of the invention, it is desired to have the capability to replace air valves 36 quickly, without loose parts, significant disassembly, and the like. The configuration of valves 36 as a self contained cartridges achieves this. To eliminate loose components, and to improve reliability, valves 36 are configured to be springless. In a preferred configuration to achieve this, air pressure is used to bias the cartridge valves 36 to a home (normal) position without the use of mechanical springs. Even when designed for infinite life (low stress), mass produced springs can fail due to inadvertent wire defects introduced by coiling or end-forming processes, buckling and subsequent rubbing against valve parts and so forth, and the present invention enables avoiding these problems. This is a significant advantage for retarder control applications, as a result of the high pressures used, e.g., in a range including a maximum air pressure of about 100 psi, and the environmental conditions, e.g., hot and cold extremes, dust, and humidity, present in many rail yards.

Figure 9:
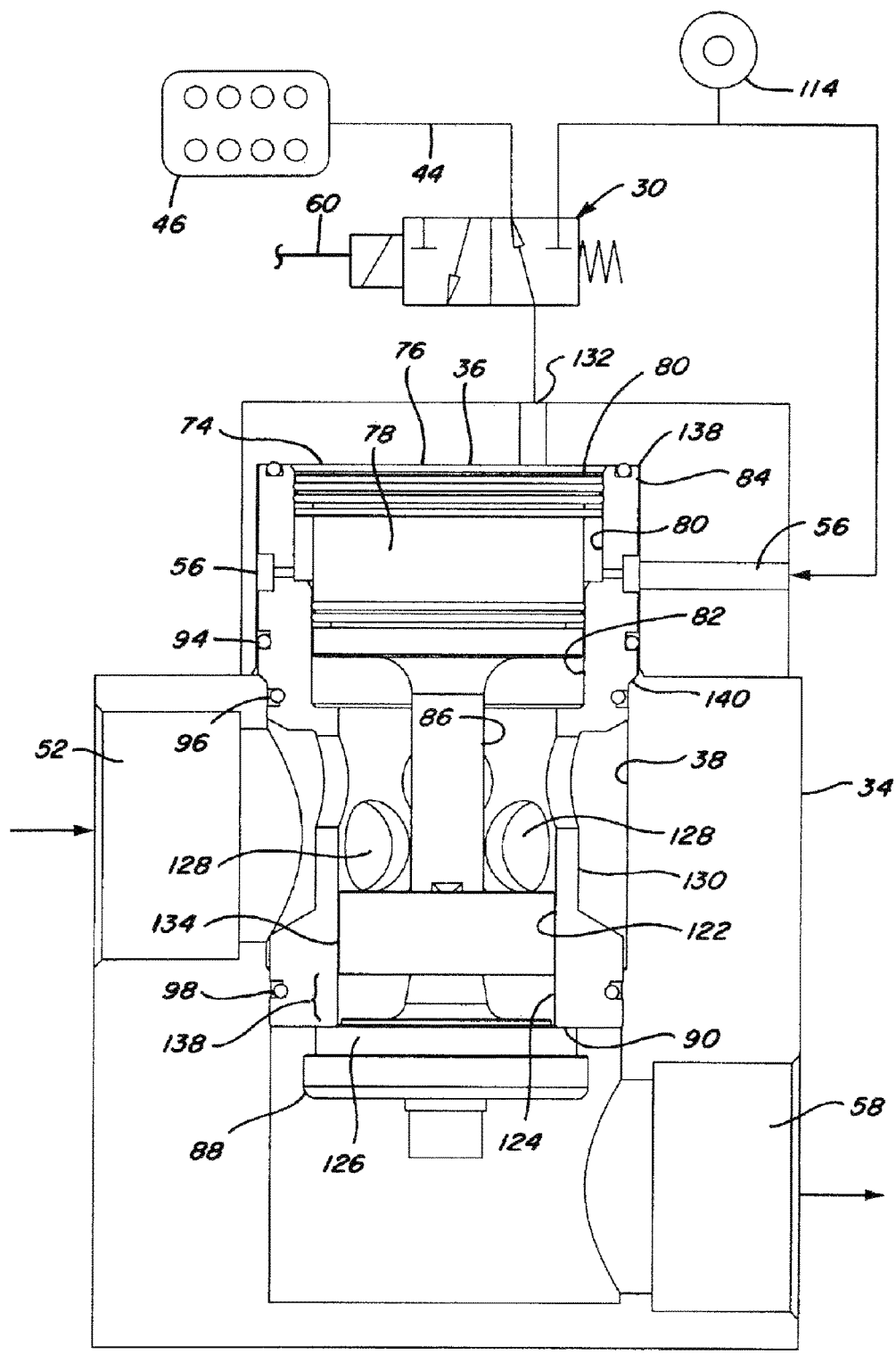
FIG. 9 is a sectional view through a representative air inlet valve of the invention, in place within a valve receiving cavity of a manifold of the invention.
Figure 10:
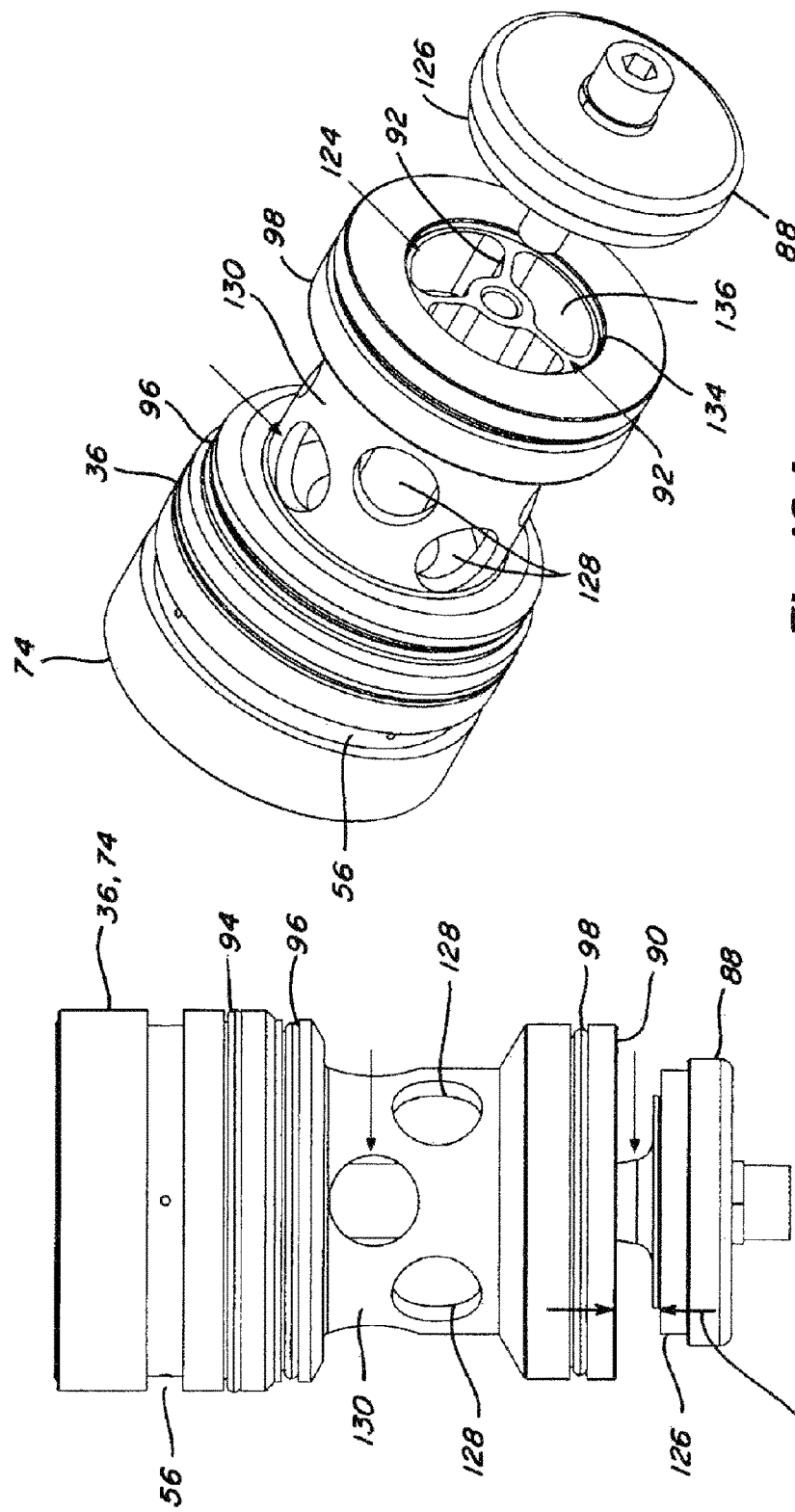
FIG. 10 is a fragmentary side view of the cartridge body of the valve of FIG. 9.
Figure 11:
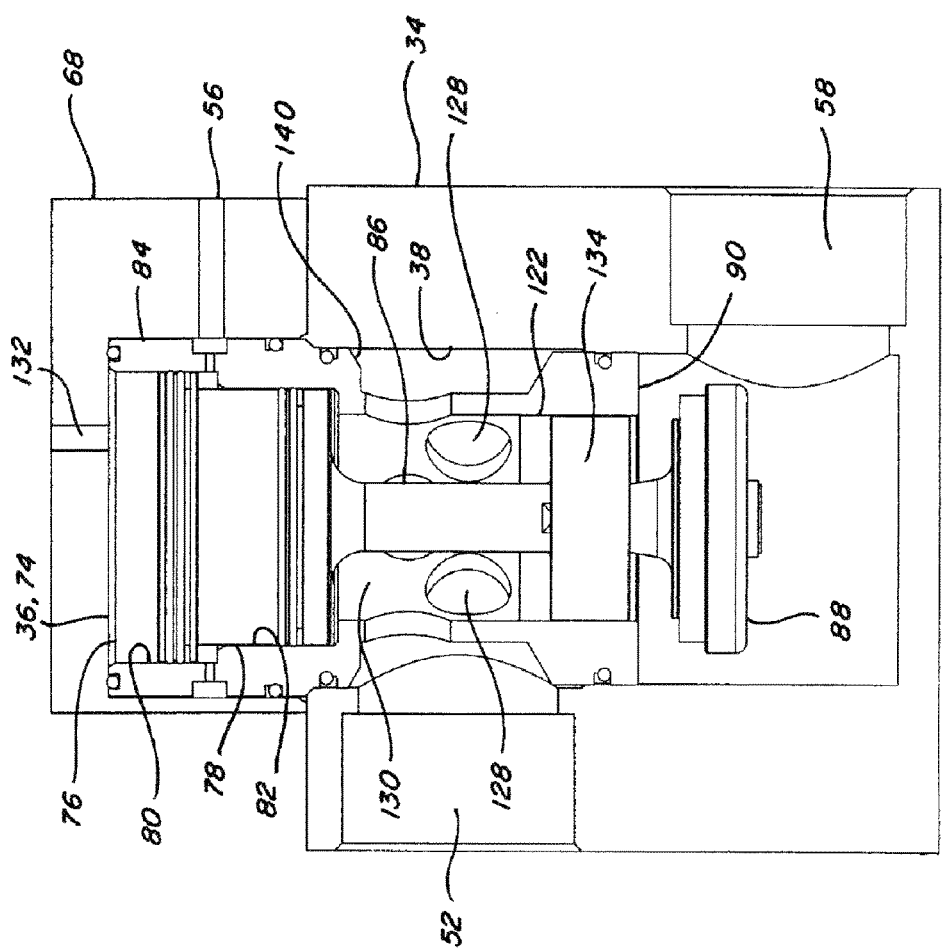
FIG. 11 is a sectional view through the representative valve and manifold of FIG. 9, in an open state.
Figure 12:
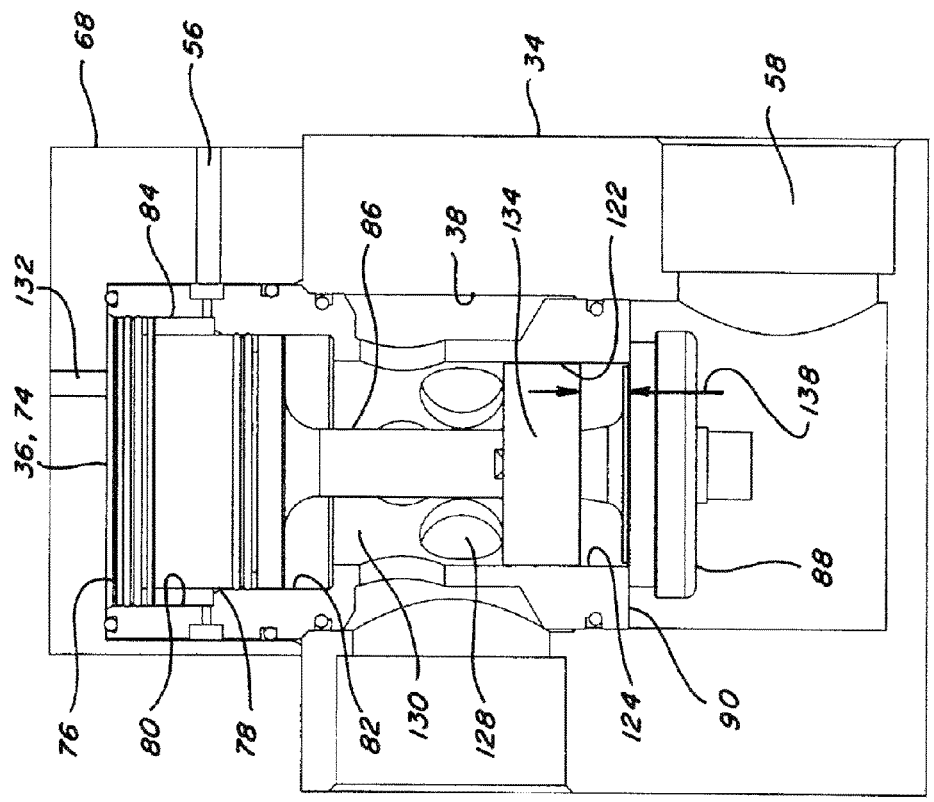
FIG. 12 is another sectional view through the representative valve and manifold, in a closed state.

Referring also to FIGS. 9, 10, 10A, 11, 12, and 12A, a representative cartridge valve 36 is shown, including in FIGS. 9, 11, 12, and 12A, within an air valve receiving cavity 38 of a representative manifold 34 for illustrating aspects of operation and advantages. Valve 36 in FIGS. 9, 11, and 12 is shown in an air inlet configuration for controlling air flow to the retarders, and in FIG. 12A in an air exhaust configuration for controlling exhausting of air from the retarders. As noted above, valve 36 is springless, and preferably employs a stepped differential pilot piston member 74 so that two pistons 76, 78 thereof of different diameters reside in correspondingly sized cylinder bores 80, 82, here located within a first end of a cartridge body 84 retained and covered by a cap 68. A spool 86 connects to piston member 74 and extends through a bore 122 in cartridge body 84, connecting bores 80, 82 to an opening 124 through second end of body 84. A poppet 88 is connected to a free end of spool 86 and is configured to form a sealed condition with a valve seat 90 disposed about opening 124. Pistons 76 and 78, spool 86, and poppet 88 are configured to be movable as a unit within bores 80, 82, and 122, to move poppet 88 relative to valve seat 90 from a closed sealed position through a range of open positions spaced from valve seat 90. A gasket 126 is preferably provided about poppet 88 for facilitating the sealed condition with valve seat 90. Cartridge body 84 additionally includes at least one and preferably a plurality of side openings 128 through a sidewall 130 thereof, to enable air flow through bore 122.

Figure 12A:
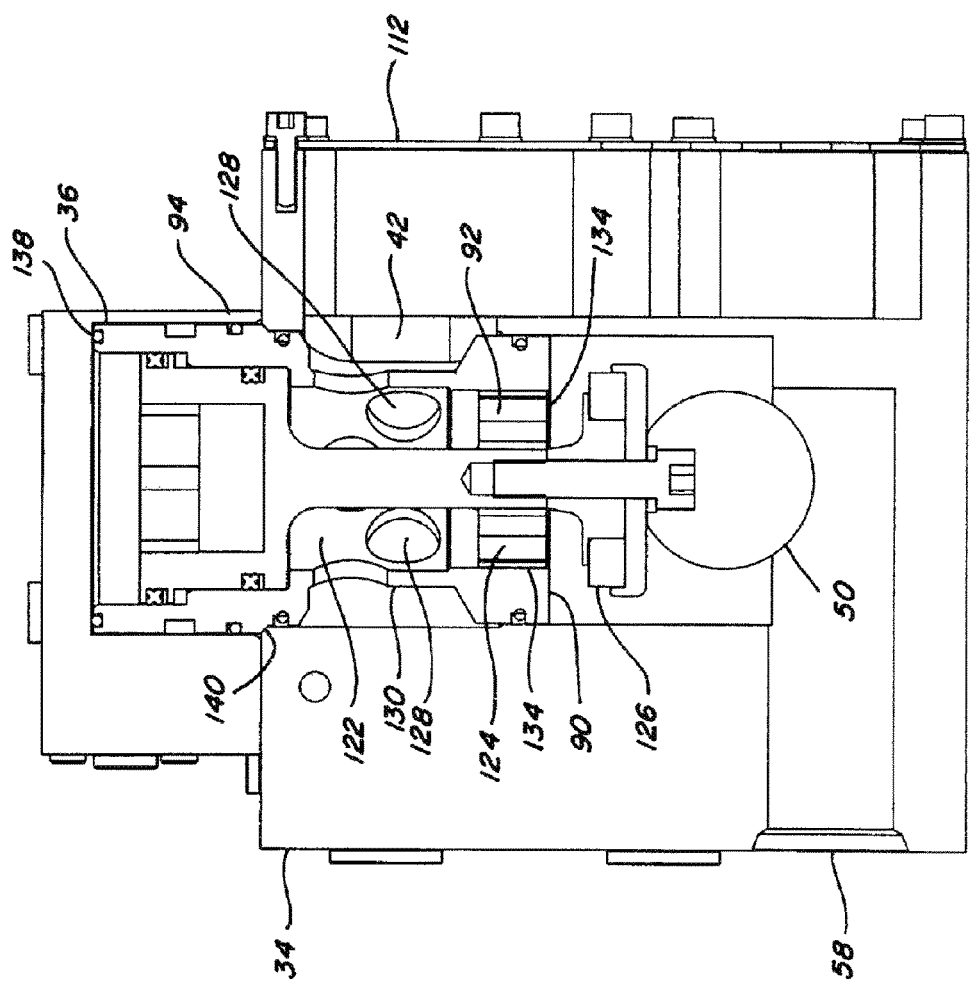
FIG. 12A is a sectional view through a representative air exhaust valve of the invention, in an open state, and in place in a valve receiving cavity of a manifold of the invention.

In FIG. 9 the associated pilot control device 30 is illustrated connected to the valve 36. Pilot air supply passage 56 is shown connected to the same air supply as device 30, and here comprises an annulus about cartridge body 84 connecting via ports to cylinder bore 80 about the valve, but not to the outboard end of the bore 80, which in this orientation is above piston 76. Pilot air is delivered to the outboard end of bore 80 only via a pilot signal passage 132 by operation of pilot control device 30, by shifting it to its left hand position. It can be observed by comparing FIGS. 9 and 11, that the portion of bore 80 below piston 76 has an extent in the direction of movement of the piston member 74 that is greater than the extent of piston 76 in that direction. This provides a region or volume of bore 80 between pistons 76 and 78 which is used for holding a quantity of the pressurized pilot air from supply passage 56 at all times, including when piston member 74 is in its lowest position as illustrated in FIGS. 10, 11, and 12A, corresponding to poppet 88 in its fully open position, and when in the closed position as shown in FIGS. 9 and 12.

When pressurized pilot air from passage 56 is present in the region of bore 80 between pistons 76, 78, which is at all times during the preferred manner of operation, the pistons and associated valve spool 86 is biased by that pressurized air in a direction toward the larger piston 76 (here upwardly) to provide valve 36 with a home (normal) position, as illustrated in FIGS. 9 and 12. This air pressure acting on the differential piston area creates a large biasing force that overpowers any resistance to movement such as seal friction or debris, and does not need a spring force to bias the piston member toward the closed position.

By employing constant pilot air pressure in the region of bore 80 between the two pistons 76, 78, valve 36 can be shifted with or without application of any additional pressure to the valve other than the pressure of a pilot signal introduced into the end of bore 80 via pilot signal passage 132 connecting with the pilot control device. If device 30 is operated to vent the pilot signal pressure, e.g., to exhaust passage 44, (in the right hand position as illustrated) it can be seen that the force balance acting on valve 36 will be biased in the upward direction, to modulate pistons 76, 78 to move to the upper position, so as to close poppet 88 (directional callouts, e.g., up, down, right, left, herein being used for reference purposes only and being non-limiting). Conversely, introduction of pilot signal pressure into the outboard (upper) end of bore 80 via passage 132 (by shifting pilot control device 30 to left hand position) will move pistons 76, 78 in the downward direction to open poppet 88. Cartridge valve 36 is configured in this manner to be useable to control either vacuum, exhaust, or positive air pressure and in normally passing (open) or in normally not-passing (closed) modes, and it is emphasized that these piston movements are achieved in a springless manner.

As illustrated in FIGS. 9, 11, and 12, valve 36 is shown in association with a manifold 34 including an air supply port 52 for use as an air supply valve. As illustrated in FIG. 12A alternatively, for use as an exhaust valve, that port can be denoted as exhaust passage 42 and appropriately plumbed, e.g., connected to an exhaust galley covered by a vented cover plate 112, or a muffler, instead of an air supply line. Otherwise there is no physical difference between valves 36 utilized for air supply or air exhaust control purposes, such that the valves 36 are interchangeable for those purposes.

Whether the cartridge valve 36 is used to control supply air or for exhaust air, the action of internal valve pressure as contained in bore 80 in connection with passage 56 and retained by the check valve 43, will assure the valve remains closed even if the pilot air supply is lost.

As the pistons 76 and 78 of differential pilot piston member 74 move in the two differently-sized bores 80, 82, the volume of the portion of bore 80 between them changes from a maximum value at the home position to a minimum value in the "operated" position at full piston stroke with poppet 88 fully open. The same pilot air source that supplies the valve, e.g., passage 56 or an external supply, is constantly directed into bore 80 between the two piston diameters to bias the valve closed (FIGS. 9 and 12). When the pilot control device 30 is operated to send pilot air to the upper end of bore 80 so as to act against the upper or outboard end of the larger piston 76, the constantly-supplied pressure in the portion of bore 80 between the pistons 76, 78 is compressed slightly to the point where pressure is sufficiently increased to push the air back into the pilot air supply passage 56. The diameter of the connecting passage(s) may be purposely made small in order to slightly slow down the piston speed to reduce impact loads at the end of piston stroke which will improve valve life. Fresh pilot air is thusly introduced into the volume between the pistons 76, 78 each time the valve cycles so any heat of compression is dissipated.

Depending on the requirements of a valve application, the pilot air side (upper end as illustrated) of the large piston 76 may be solid or may include a cavity to add volume to the pilot air circuit and reduce mass of the piston-spool-poppet assembly. Lowering the mass of moving valve parts proportionally reduces the impact loads at each end of the stroke which increases valve life. Adding cavity volume provides an air-spring effect that occurs as pilot air pressure increases to the point where the poppet 88 unseats and begins to move. After separation occurs, the force necessary to continue the stroke decreases substantially, and the pilot air volume inside the piston cavity expands to finish opening the poppet valve. On the closing stroke, the additional cavity volume makes it easier to slightly slow down the closing speed by purposely restricting the exhaust passage similar to a meter-out cylinder control circuit. Since kinetic energy is equal to ½ mass times velocity-squared, a small decrease in peak velocity (speed) makes a large difference in impact loads. Valve flow rate is not materially affected due to the high flow capability of a poppet-style valve when only a short distance separates poppet 88 and valve seat 90.

Optionally, as another feature of the invention the pilot air side of the piston member 74 can be configured to accept an assembly tool to resist applied torque during assembly/disassembly of the cartridge valve components.

In many known prior art poppet valves, air flowing through the poppet valve and into connecting passages in the valve body create side forces on the spool acting to shift it off-axis so that the poppet and seat contact at one spot on the circumference which causes the rubber poppet gasket to wear unevenly and leak prematurely. It has been found that prior known external bearings limit this effect but are subject to positional inaccuracies due to manufacturing tolerance stack-up, and worn bearings are not always replaced when the valve spool is replaced so over time the external bearing constraint on axial position deteriorates.

To overcome the above problem, spool 86 includes an internal load distributing element or elements for transferring and distributing side loads exerted thereagainst, and for guiding movements of the spool and poppet, particularly when closing. The preferred load distributing elements include radially outwardly extending vanes 92 at angularly spaced locations around the spool, which connect with a guide bearing 134 extending about bore 122. Bearing 134 and vanes 92 define and bound at least one air flow passage 136 (see FIG. 10A) connecting the open end of the cartridge body with the side openings 128. This structure is configured to be sufficiently strong and robust to assure axial alignment of the poppet 88 and seat 90 within a few thousandth of an inch, even under severe side loading conditions resulting from high pressure, e.g., a 100 psi differential pressure condition, and/or high velocity air flow conditions.

In a preferred configuration and manner of operation, when poppet 88 is closed guide bearing 134 is disposed substantially completely within cartridge body 84, spaced in the direction of movement from valve seat 90 and poppet 88 by a space 138 (FIG. 9), and fully contacting the internal surface of sidewall 130 of the cartridge body bounding and defining bore 122. Preferably the extent of space 138 in the direction of movement, will about equal or be just marginally less than the distance or extent of the movement of poppet 88 between the closed position (FIG. 9) and its fully open position (FIGS. 10 and 12).

When poppet 88 initially opens, guide bearing 134 will move in the opening direction with the poppet, but will still be spaced (space 138) from the valve seat and opening. This has the effect of providing a larger overall air flow area just inside cartridge body 84 directly adjacent to valve seat 90 and the air flow path between the valve seat and poppet when poppet 88 opens and when it closes, which can reduce or buffer pressure and resulting forces on the associated gasket and facilitate distribution of the air flow more evenly between the passage 136. As poppet 88 moves, bearing 132 will move with it, and will only be closely located to or in the opening 124 when the poppet is fully open. The vanes 92 and bearing 132 additionally act to constrain poppet 88 as it moves toward valve seat 90 so that both initial and final contact is made over the full valve sealing area to reduce stress on the gasket and increase its service life. In contrast, known prior art valve designs support the spool end in an external bearing bore, or leave it unguided and unsupported.

To minimize overall size and to simplify manifold manufacturing, it is common practice to use a single diameter body bore to receive a cartridge valve. Connecting air passages intersect the body bore and leave sharp edges that should be radiused or chamfered in order to avoid cutting the cartridge seals as they pass the intersecting passage. Even with radiusing/chamfering, it has been found that it is still difficult to avoid cutting the seals because the seal is initially compressed by the receiving bore then expands (bulges) into the intersecting passage as it passes so the seal must be recompressed somehow to avoid pinching or cutting the seal.

The present invention employs graduated size seals 94, 96, 98, decreasing in diametrical extent, respectively, disposed in appropriately sized grooves in the cartridge body 84, and the receiving cavity 38 in manifold 34 has stepped-diameters (decreasing in diametrical extent) to mate with the seals. As a result, there is reduced possibility of cutting or pinching a seal because the intersecting passage does not break through into the cavity at a location where the diameter is less than the major diameter of a seal that passes through the intersecting passage during installation.

In known prior art cartridge valves, when air pressure is being controlled by the valve, it acts on the stepped bores to bias the cartridge valve toward the larger diameter at the pilot end. Then, when pilot pressure is applied to shift the valve, the whole cartridge body would move in the receiving bore by the amount of end clearance present (will vary due to tolerances). This has the effect of changing static seals into dynamic seals with a higher potential for wear and leakage.

Figure 17:
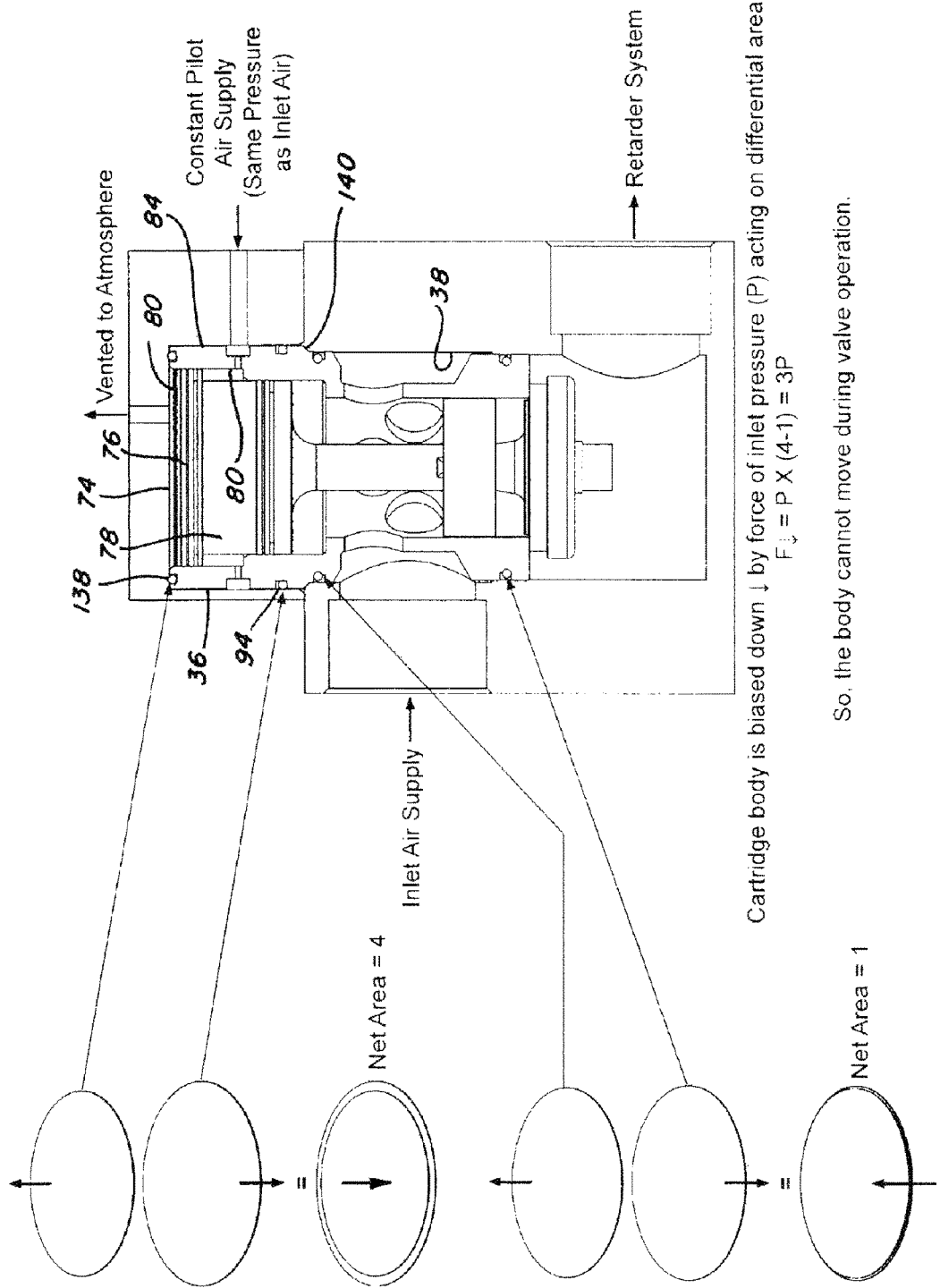
FIG. 17 is a sectional view through a representative air inlet valve of the invention, in place within a valve receiving cavity of a manifold of the invention, with an illustration of force balance acting on a cartridge body of the valve.

Referring to the cartridge body force balance diagram of FIG. 17, the present invention overcomes this biasing force with a larger force in the opposite direction that is created by the constant pilot pressure to the differential pilot piston member 74 that also acts on the differential area between the largest cartridge body seal 94 and a smaller body seal 138 in an end groove just outboard of the piston member 74. Since the resulting force biases the cartridge body 84 in the same direction as when pilot air is applied to the piston member 74, there is no cartridge body movement in the receiving cavity 38. Here, it should be noted that the numerical representations in FIG. 17 are for purposes of illustration only, can vary widely for different valve configurations, and thus are not intended to be limiting.

An aspect of this invention is to provide a fast method of completely renewing the valve after it is installed in the manifold so that downtime and maintenance labor is minimized. At least one preferred embodiment of the self-contained cartridge valve, e.g., valve 36, comprises an assembly that contains all seals and wearing surfaces but no external loose parts that can be accidentally misplaced or lost. The cartridge valve 36 fits into a main body, e.g., cavity 38 of manifold 34, where piping connection ports are provided but which contains no wearing surfaces or parts. The valve cartridge is secured in the main body, e.g., with abutting elements 144, here mating abutting shoulders about the exterior of cartridge body 84 and about receiving cavity 38, using retainer cap 68, which is fastened by screws, bolts, etc. This arrangement allows a valve to be completely renewed by replacing the valve cartridge in just a few minutes from start to finish.

This description utilizes as an exemplary embodiment a two-way/two-position cartridge valve but also applies to 3-way/two-position cartridge valves as one skilled in the art would recognize.

Because the cartridge valves 36 are configured to close or remain closed in the event supply air pressure is lost, there is the possibility of trapped air in the system which may be desired to be released before performing maintenance on the valve assembly. To provide this function, the valve assemblies of the invention can include a retarder pressure vent automatically operable upon loss of supply air pressure to vent pressure in the internal passages of the valve assembly conditions in the event of loss or reduction of air supply. The retarder pressure vent is preferably configured as a cartridge air valve so as to be quickly and easily removable and replaceable for complete renewal, although other configurations can likewise be used.

Figure 14:
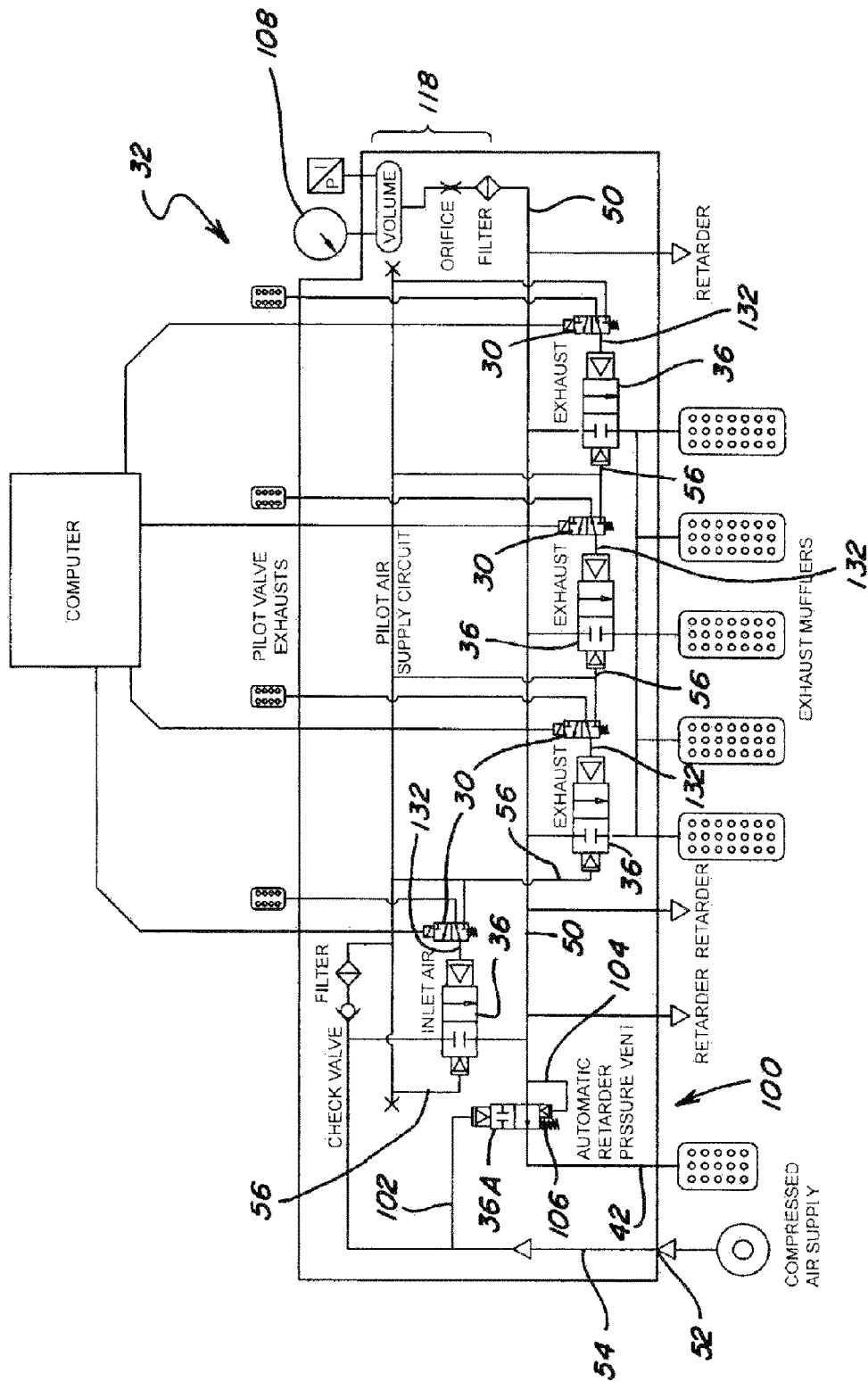
FIG. 14 is a simplified schematic view of a pneumatic circuit for the retarder control system including the valve assembly incorporating the automatic retarder pressure vent of FIGS. 13 and 13A.
Figure 15:
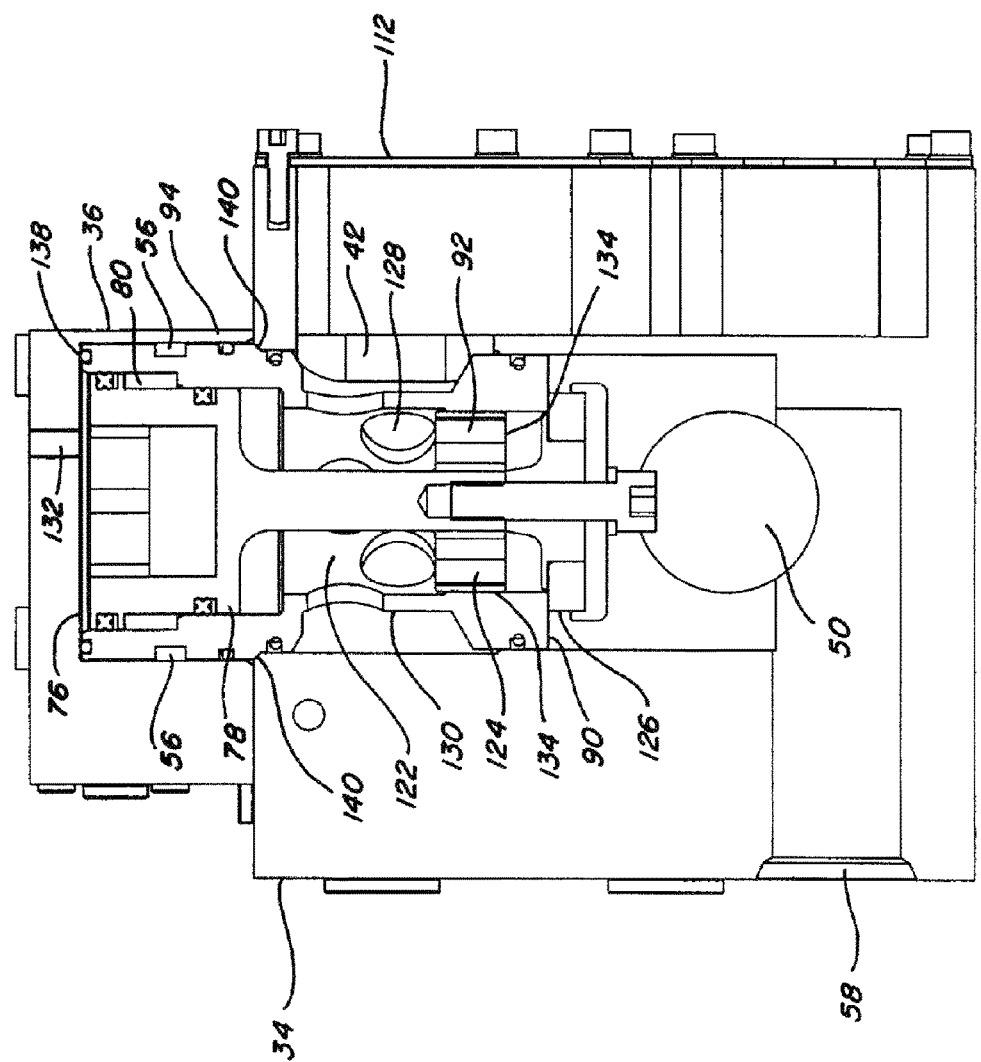
FIG. 15 is a sectional view through the representative valve and manifold, in a closed state, and illustrating balance forces exerted in that state.
Figure 16:
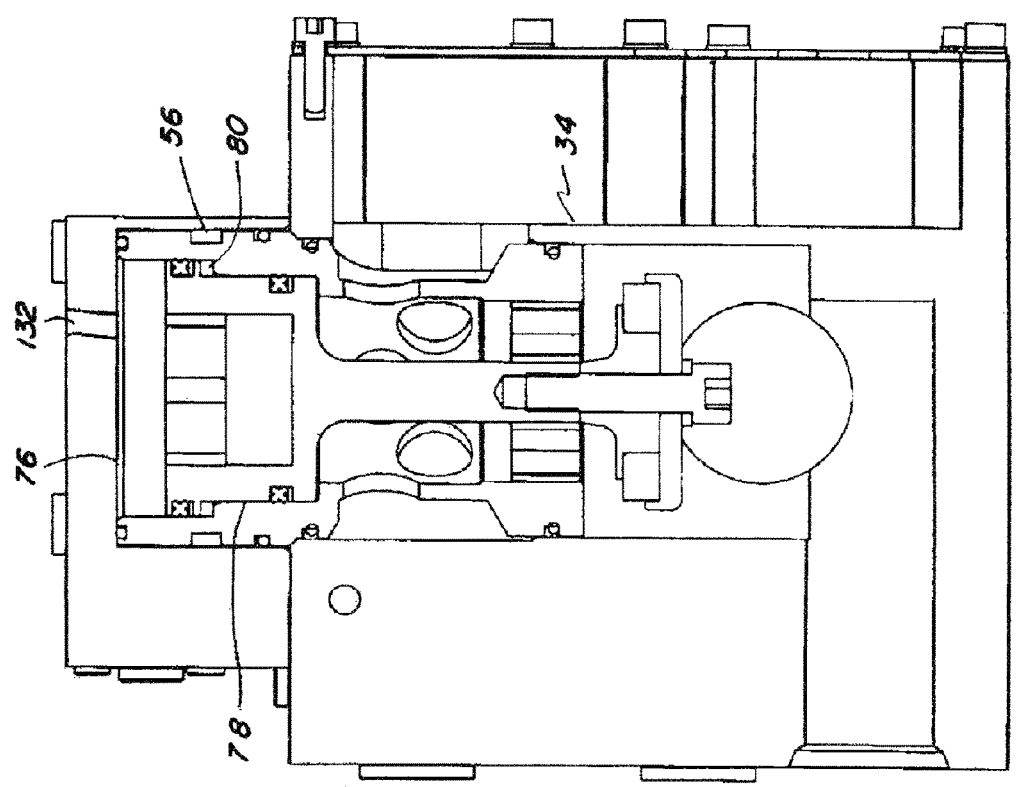
FIG. 16 is another sectional view through the representative valve and manifold, in an open state, and illustrating balance forces exerted in that state.

Referring also to FIGS. 13 and 13A, air valve assembly 32 of the invention is shown additionally incorporating an automatic retarder pressure vent 100. The pneumatic circuitry of air valve assembly 32 incorporated into a retarder control system is shown in FIG. 14 and is essentially the same as that shown in FIG. 5 above with the addition of retarder pressure vent 100. Valve assembly 32 includes one valve 36 configured for controlling inlet air, and three for controlling exhaust, although other configurations can be used as desired or required for a particular application. Retarder pressure vent 100 includes an air valve 36A plumbed in connection with main air passage 50 and an exhaust passage 42 venting to an exhaust muffler, so as to be operable for venting pressurized air in passage 50 through the muffler. Instead of a pilot control device, an inlet supply pilot control line 102 connects with air supply port 52/main air supply passage 54 to provide a pilot signal acting to close the valve when supply pressure is present. A second pilot signal line 104 connects with main air passage 50 and provides a counter signal to the signal supplied by line 102, along with a spring 106. In the event of loss of or significant drop in supply pressure, spring 106 and any remaining pressure in passage 50 will force valve 36 open to vent passage 50, thereby automatically depressurizing assembly 32.

As an additional feature, assembly 32 is shown including a retarder pressure gauge 108 plumbed in connection with main air passage 50, which is preferably located in an associated control box containing the pilot control devices 30 so as to be readable to verify depressurization prior to servicing.

As a preferred configuration, the additional air valve 36A of vent 100 is also a cartridge valve, configured so as to be operable and renewable in the above described manner in reference to FIGS. 9-12. It is preferably contained in an air valve receiving cavity 38A in a suitable housing, which can be manifold 34, or alternatively, a segment or appendage 110 attached thereto, and the valve can be retained in place by a suitable retaining cap 68 in the above described or other suitable manner. Spring 106 (FIG. 14) can be located beneath or within cap 68 so as to bias valve 36A in the open direction.

Thus it is demonstrated a multiple valve assembly for controlling pneumatic flow to and from devices such as, but not limited to, retarders for controlling speed of rail cars, can be configured for ease and quickness of service and complete renewal of all moving components and wear items, while all associated pneumatic passages and lines remain intact and connected.

In light of all the foregoing, it should thus be apparent to those skilled in the art that there has been shown and described a valve assembly and system for a retarder control. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A retarder control valve, comprising:
  a hollow cartridge body having a sidewall bounding a bore having a first end and an opposite open second end, the sidewall including at least one side opening connected to the bore between the first end and the open second end and a valve seat disposed about the open second end;
  the first end of the cartridge body containing a differential pilot piston member movable therein responsive to pilot signals, a spool connected to the differential piston member for movement therewith and extending through the bore to the open end, and a poppet connected to the spool and movable therewith relative to the valve seat between a closed position in sealed relation therewith, and a fully open position spaced therefrom; and
  at least one vane extending sidewardly from the spool within the bore to at least one guide bearing larger than the vane when viewed from the side, disposed and configured to move with the vane while in contact with the sidewall of the cartridge body for transferring and distributing loads exerted against the spool to and about the cartridge body.

2. The retarder control valve of claim 1, wherein the guide bearing is hollow and with the at least one vane defines and bounds at least one air flow path through the cartridge body between the at least one side opening and the valve seat.

3. The retarder control valve of claim 1, wherein the cartridge body comprises at least one seal thereabout positioned and configured to form a sealed relation with an inner surface bounding and defining a valve receiving cavity when the valve is located therein, and wherein the valve is configured to substantially immobilize the cartridge body and the at least one seal thereabout when pressurized air is present and the valve is operated to control flow of the pressurized air.

4. The retarder control valve of claim 1, wherein the valve is springless such that the movements of the differential pilot piston member are controlled substantially solely by the pilot signals.

5. The retarder control valve of claim 1, wherein the valve is contained in an individual valve receiving cavity of a valve assembly of a retarder control system for slowing movement of rail cars, and is connected to a supply of pressurized air via piping or to atmosphere, and separately by piping to at least one retarder of the control system.

6. The retarder control valve of claim 5, wherein the valve receiving cavity is part of a structure configured to allow removal and replacement of the valve while substantially all of the piping remains connected.

7. The retarder control valve of claim 5, wherein the valve assembly comprises a plurality of the valves contained in a plurality of the individual valve receiving cavities, respectively.

8. The retarder control valve of claim 1, wherein the at least one guide bearing is configured to remain at least substantially completely within the bore of the cartridge body throughout a range of the movement with the vane.

9. A pilot controlled springless retarder control valve, comprising:
  a hollow cartridge body having a sidewall bounding a bore having a first end and an opposite open second end, the sidewall including at least one side opening connected to the bore between the first end and the open second end and a valve seat disposed about the open second end;
  the first end of the bore having different diameters and containing a differential pilot piston member having pistons of different diameters, the differential piston member being movable within the bore responsive to pressurized air pilot signals, a spool connected to the differential piston member for movement therewith and extending through the bore to the open end, and a poppet connected to the spool and movable therewith relative to the valve seat between a closed position in sealed relation therewith wherein pressurized air will be prevented from flowing past the valve seat, and a fully open position spaced from the valve seat to allow flow of the pressurized air therebetween and through an air flow path of the bore bounded generally by the differential piston member and the poppet; and
  the differential piston member, the spool, and the poppet being configured so as to be movable solely by the pressurized air pilot signals when present.

10. The retarder control valve of claim 9, further comprising at least one vane connected to and extending sidewardly from the spool for movement therewith within the air flow path of the bore, the at least one vane being connected to least one guide bearing disposed in contact with the sidewall of the cartridge body about the air flow path for transferring and distributing loads exerted against the spool to and about the cartridge body.

11. The retarder control valve of claim 10, wherein the guide bearing is hollow and extends at least substantially completely around the bore and about the air flow path.

12. The retarder control valve of claim 9, comprising pilot signal passages connecting to ends of a larger of the different diameters of the first end of the bore so as to be in communication with ends of a larger of the pistons of different diameters.

13. The retarder control valve of claim 9, wherein the cartridge body comprising at least one seal thereabout positioned and configured to form a sealed condition with an inner surface bounding and defining a valve receiving cavity when the valve is located therein, and wherein the valve is configured to substantially immobilize the cartridge body when the pressurized air is present and the valve is operated to control flow of the pressurized air.

14. The retarder control valve of claim 9, wherein the valve is contained in an individual valve receiving cavity of a valve assembly of a rail car retarder control system, and is connected to either a supply of pressurized air via piping or to atmosphere, and separately by piping to at least one retarder of the retarder control system.

15. The retarder control valve of claim 14, wherein the valve receiving cavity is part of a structure of the valve assembly configured to allow removal and replacement of the valve while substantially all of the piping remains connected.

16. The retarder control valve of claim 14, wherein the retarder control system comprises a plurality of the valves contained in a plurality of the individual valve receiving cavities, respectively.

* * * * *